US012806629B2

(12) United States Patent
Lundgaard et al.

(10) Patent No.: US 12,806,629 B2
(45) Date of Patent: Nov. 24, 2026

(54) SYSTEM AND METHOD FOR TREATING A COMBINATION OF A LIQUID AND PARTICULATE MATTER

(71) Applicant: Trebo ApS, Søborg (DK)

(72) Inventors: Christian Lundgaard, Søborg (DK); Andreas Leth Bockhoff, Søborg (DK); Stig Träff, Søborg (DK); Thomas Trebbien, Søborg (DK)

(73) Assignee: Trebo ApS, Søborg (DE)

( * ) Notice: Subject to any disclaimer, the term of this patent is extended or adjusted under 35 U.S.C. 154(b) by 0 days.

(21) Appl. No.: 18/854,451

(22) PCT Filed: Apr. 5, 2023

(86) PCT No.: PCT/EP2023/058984
§ 371 (c)(1),
(2) Date: Oct. 4, 2024

(87) PCT Pub. No.: WO2023/194464
PCT Pub. Date: Oct. 12, 2023

(65) Prior Publication Data
US 2025/0339863 A1 Nov. 6, 2025

(30) Foreign Application Priority Data
Apr. 6, 2022 (EP) .................................... 22166857

(51) Int. Cl.
*B03B 5/18* (2006.01)

(52) U.S. Cl.
CPC ..................................... *B03B 5/18* (2013.01)

(58) Field of Classification Search
CPC .................................... B03B 5/18; B03B 5/24
(Continued)

(56) References Cited

U.S. PATENT DOCUMENTS 1,910,386 A * 5/1933 Garrett .................. B03D 1/245 261/81
4,253,947 A * 3/1981 Fan ......................... C02F 3/085 210/618

FOREIGN PATENT DOCUMENTS

CN 102 698 863 A 10/2012
EP 1224030 B1 * 12/2003 ............... B03B 5/10
(Continued)

OTHER PUBLICATIONS

International Search Report issued in Int'l Application No. PCT/EP2023/058984, mailed Aug. 4, 2023, 4 pages.
(Continued)

*Primary Examiner* — Molly K Devine
(74) *Attorney, Agent, or Firm* — McDonnell Boehnen Hulbert & Berghoff LLP

(57) ABSTRACT

A system includes a liquid and a particulate matter including two types of particles having a density lower than the liquid and different fluid-mechanical properties in the liquid. The system includes a chamber for holding the liquid and particulate matter and a sifting device configured for vertical movements within the chamber. The sifting device allows the liquid of the composition to be treated to move through the sifting device, while not allowing particulate matter in the composition to move through the sifting device during the vertical movements. The system includes a drive system for moving the sifting device in vertical movements within the chamber whereby the particulate matter within the liquid is treated. The drive system is configured for positioning the sifting device so that a lower surface of the sifting device is above the particulate matter and whereby particulate matter is moved downwards in the chamber.

20 Claims, 26 Drawing Sheets

(58) Field of Classification Search
USPC .............................................. 209/13, 44, 263
See application file for complete search history.

(56) References Cited

FOREIGN PATENT DOCUMENTS

| | | | |
|---|---|---|---|
| GB | 761 346 | A | 11/1956 |
| WO | 2020119873 | A1 | 6/2020 |

OTHER PUBLICATIONS

Written Opinion issued in Int'l Application No. PCT/EP2023/058984, mailed Aug. 4, 2023, 6 pages.

* cited by examiner 803
104
900
300

SYSTEM AND METHOD FOR TREATING A COMBINATION OF A LIQUID AND PARTICULATE MATTER

FIELD

The present application relates to a stratification system and a method for treating particulate matter in a liquid, wherein the particulate matter comprises two or more types of particles having densities lower than the liquid and having differing fluid-mechanical properties, whereby the treatment allows for the separation of the different types of particles.

BACKGROUND

The globally widespread use of plastic materials and the associated production of plastic waste and pollution is a well-known challenge to the environment, which attracts significant scientific and political attention. Moreover, most plastic materials require non-renewable materials in its production such as fossil fuels. However, since plastic is a very versatile, useful material, it is indispensable in the present industrialized world, and the annual global production of plastic has ever since its invention in the 1950's increased and exceeded 300,000,000,000 kg annually in 2019.

Although the majority of plastic waste is suited for recycling purposes, more than 90% of the global production of plastic is either incinerated, deposited or dumped in nature. Recycling of plastic is typically limited to products of a single type of plastic as melting and reusing products of several different types of plastic tend to create polymer blends that exhibit structural and mechanical weaknesses. The production of one kilogram of virgin plastic requires on average three kilograms of natural oil and this makes the plastic industry a global large-scale emitter of greenhouse gasses. As millions of tonnes of plastic ends up in the environment every year and the production of most plastic materials are based on fossil fuels, recycling of plastic is a critical step in the green energy changeover and the pursuit for a sustainable future. As a result, plastics, and the production thereof, impose significant strains on the resources and environment of the planet.

The most common combination of plastics waste is mixtures of of PE and PP accont for almost 80% of the global waste. PP and PE have both low densities compared to for example water and it is essential the sustainable recycling of these water materials to develop efficient methods for sorting and separating these mixtures of materials.

Current methods for sorting plastics, in particular in particulate form, include the the sink and float technique, where the particulate matter is submerged in a medium, so that two clear fractions of the particles are separated, one sinking to the bottom of the medium and one floating to the top, such that both fractions may be removed. Such methods have the limitation that the separation of the particles is usually not satisfactory, and such methods is not useful for separating mixtures of different types of particles which all sinks or floats in the medium. WO2020119873 describes a system to treat and separate particles in a liquid where the densities of particles are higher than the density of the liquid. However, such a system is not suitable for treating and separating particles which are ligther than the liquid. Therefore, there is an urgent need for finding further and better solutions for sorting and separating plastics and thereby providing more sustainable recycling and reusage of plastic.

SUMMARY

The present disclosure describes stratification systems and methods offering improvements to drawbacks of the background art including but not limited to improved stratification systems and methods providing for closed loop quality treatment and separation of particles in mixtures of particulate matter submerged in liquids having a density larger the the particulate matter.

Accordingly, in a first aspect the invention provides a stratification system for treating a composition comprising a liquid (300) and a particulate matter (400), wherein the particulate matter (400/500) comprises two or more types of particles (500) having i) a minimum particle size, ii) a density lower than the density of the liquid (300) and iii) different fluid-mechanical properties in the liquid (300), wherein the stratification system comprises a stratification machine comprising:

a) a stratification chamber (100) for holding the combination of liquid (300) and particulate matter (400), said stratification chamber having one or more side walls (101);

b) a first movable sifting device (200) configured for vertical or near-vertical up and down movements within the stratification chamber, wherein the first movable sifting device allows the liquid (300) of the composition to be treated to move through the sifting device, while not allowing particulate matter (400) in the composition to the treated to move through the sifting device, during said vertical or near-vertical movements; and c) a first drive system (600) connected to the first movable sifting device for moving the first movable sifting device in vertical or near-vertical downwards and upwards movements within the stratification chamber whereby the particulate matter (400) within the liquid is treated;

wherein the first drive system is configured for positioning the first sifting device so that a lower surface (201) of the first movable sifting device is above the particulate matter (400) in the composition to be treated and whereby particulate matter (400) is moved downwards in the stratification chamber by downwards movements of the first movable sifting device.

In a second aspect, the invention provides a method for treating a composition comprising a liquid and a particulate matter comprising the steps of:

d) providing a stratification system of the invention;

e) providing a composition to be treated comprising a liquid and a particulate matter, wherein the particulate matter comprises two or more types of particulate matter having i) a minimum particle size, ii) a density lower than the density of the liquid and iii) different fluid-mechanical properties in the liquid;

f) placing the composition to be treated in the container and/or stratification chamber of the stratification system below the first sifting device of the stratification system;

g) providing a series of downwards and upwards movement of the particulate matter within the liquid by means of downstrokes and upstrokes of the first sifting device, each movement characterised in having an acceleration, a velocity and an amplitude; and h) optionally comprising a discharge step, wherein the particulate matter is discharged from the container and/or stratification chamber.

BRIEF DESCRIPTION OF THE FIGURES

The figures included herein are illustrative and simplified for clarity, and they merely show details which are essential to the understanding of the invention, while other details may have been left out. Where reference numerals are used in drawings, the specification, claims and abstract the same reference numerals are used for identical or corresponding parts. The figures and drawings include:

Figure 1:
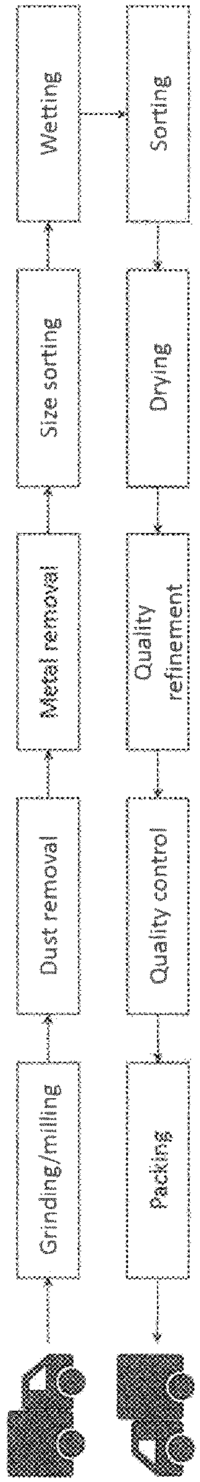
FIG. 1 shows a diagrammatic overview of a stratification system of the invention.

In the following detailed portion of the present disclosure, the invention will be explained in more detail with reference to the example embodiments shown in the drawings, in which:

All publications, patents, and patent applications referred to herein are incorporated by reference to the same extent as if each individual publication, patent, or patent application were specifically and individually indicated to be incorporated by reference. In the event of a conflict between a term herein and a term in an incorporated reference, the term herein prevails and controls.

DETAILED DESCRIPTION

The features and advantages of the system described herein is readily apparent to a person skilled in the art by the below detailed description of embodiments and working examples of the stratification system with reference to the figures and drawings included herein. One object of the stratification system described herein is to provide an improved system and method for separating and isolating different types of material in a mixture of materials, particularly plastics in waste materials. Acordingly, the stratification system described herein provides for closed circuit quality treatment and separation of particles in mixtures of particulate matter submerged in reusable liquids having a density larger the the particulate matter. The stratification system and method are particularly useful for sorting and separating particles of PP and PE in mixtures of particulate matter where it is desired to use an eco-friendly and abundantly avaiable liquid, such as plain water. PE and PP have densities which are lower than water at atmospheric pressure and temperature which makes existing sorting technology unsuitable for this task. It is estimated that 80% of the global plastic waste are mixtures comprising PP and PE, for which reason the present invention provides systems and methods for stratifying into distinct layers and subsequently discharging as separate fractions.

The term "vertical" as used herein refers to any direction which is parallel to the force of gravity.

The term "near-vertical" as used herein refers to any direction which is within an angle of ±45 degrees to the force of gravity, such as within an angle of ±20 degrees to the force of gravity, such as within an angle of +10 degrees to the force of gravity, such as within an angle of ±1 degree to the force of gravity.

The term "sedimentation" as used herein refers to movement of a particle submersed in a liquid by and in the direction of a force or combination of forces. Forces includes gravitation, centrifugal forces, mechanical, electrical and/or magnetic forces. In addition, the sedimention of a particle in a liquid is also influenced by further properties such as the densities of the particle and the liquid, the shape and surface resistance of the particle and the viscosicty and density of the liquid and the magnitude of forces such as gravity.

The term "sedimentation velocity" as used herein refers to the velocity (typically vertical) of particles suspended in a liquid under the effect of a force, typically gravity.

The term "fluid mechanical properties" as used herein refers to the interactions and interplays between the sedimentation velocity, terminal velocity, inertia effects, drag coefficient, size characteristics, form characteristics, surface characteristics, surface resistance and density of an individual particle being processed in the stratification chamber.

The term "hindered settling sedimentation velocity" refers to the sedimentation velocity of particles suspended in a liquid under the effect of gravity and where the ratio between particles and liquid is high such that the sedimentation velocity is lowered compared to a single sedimenting particle.

The term "surface resistance" as used herein refers to viscous or shear forces between the surface of the particle and the process liquid.

The term "particle" as used herein refers a localized solid material which can be attributed several chemico-physical properties such as composition, density, size and shape.

The term "particulate matter" as used herein refers to solid materials that are in the form of discrete particles, particles, granules, flakes, pellets or the like (hereinafter referred to as "particles"). Particulate matter contains of a number of particles.

The term "particle size" as used herein refers to the size of any given particle measures as its longest diameter or diagonal. Particle size can in particular be determined according to the ISO 9276 standard.

The term "types of particles" as used herein refers to particles that have a differing fluid mechanical properties, in particular differing composition of matter and associated differing densities. Such composition of matter may include PP, PE, PET, POM, PC, ABS, PC-ABS, PEEK, PVC or a combination thereof.

The term "PP" as used herein refers to polypropylene.

The term "PE" as used herein refers to polyethylene.

The term "PET" as used herein refers to Polyethylene terephthalate.

The term "POM" as used herein refers to Polyoxymethylene.

The term "PC" as used herein refers to polycarbonate.

The term "ABS" as used herein refers to acrylonitrile butadiene styrene.

The term "PEEK" as used herein refers to polyether ether ketone.

The term "PVC" as used herein refers to polyvinylchloride.

The term "stratify", "stratification" and "stratification process" and the corresponding terms "sort", "sorting" and and "sorting process" as used interchangibly herein refers to the settlement of particles into distinct, often horizontal, layers according to their respective fluid mechanical properties in a liquid.

The term "fluid mechanical properties" as used herein about particles refers to the combined effect of drag force, density, shape, diameter or diagonal, terminal velocity, hindered settling velocity and acceleration on a particle movement in a liquid suspension. Particles having different composition of matter and different sizes and shapes etc have different fluid mechanical properties.

The term "upstroke and "downstroke" as used herein refers to opposite movements in the longitudinal direction of the sorting or stratification chamber. Where the longitudinal direction of the stratification chamber is vertical or near-vertical, a downstoke is movement in the direction of the gravitation force, and an upstroke is movement in the direction opposite the direction of the gravitation force.

The term "fraction" may be understood as a group of particles of the particulate matter which have substantially the same fluid mechanical properties.

The term "particle bed" as used herein refers to particles resting against the lower surface (201) of the first sifting device (200) and/or the upper surface (203) of the second sifting device (202).

Stratification System

In a first aspect a stratification system 1 is provided for treating a composition comprising a liquid (300) and a particulate matter (400), wherein the particulate matter comprises two or more types of particles ((400/500)) having i) a minimum particle size, ii) a density lower than the density of the liquid (300) and iii) different fluid-mechanical properties in the liquid, wherein the stratification system 1 comprises a stratification machine comprising:

a) a container comprising a sorting or stratification chamber (100) for holding the combination of liquid and particulate matter, said stratification chamber (100) having one or more side walls 101;
b) a first movable sifting device (200) configured for vertical or near-vertical up and down movements within the stratification chamber, wherein the first movable sifting device (200) allows the liquid of the composition to be treated to move through the sifting device, while not allowing particulate matter (larger than a certain minimum size) in the composition to the treated to move through the sifting device, during said vertical or near-vertical movements; and
c) a first drive system (600) for moving the first movable sifting device in vertical or near-vertical downwards and upwards movements within the stratification chamber whereby the particulate matter within the liquid is treated;

wherein the first drive system (600) is configured for positioning the first sifting device (200) so that a lower surface 201 of the first movable sifting device is above the particulate matter in the composition to be treated and whereby particulate matter is moved downwards in the stratification chamber by downwards movements of the first movable sifting device.

Particles

In some embodiments the fluid-mechanical properties of the two or more types of particles (500) differs in respect to the particle's sedimentation velocity and/or hindered settling sedimentation velocity in the liquid. The sedimentation velocity and/or hindered settling sedimentation velocity of a particle in a liquid is determined and/or influenced by the surface resistance and/or in density of the particle.

The particulate matter (400) has a density which is lower than the liquid (300) and in some embodiments the particles to be sorted differs in density from each other and the difference in density between the different types of particles is between 0 to 5 g/cm$^3$, optionally between 0,1 to 2,5 g/cm$^3$ optionally between 0,25 to 1,5 g/cm$^3$ optionally between 0.5-0.9 g/cm$^3$. Alternatively, the density of one type of particles is at least 1% lower than the density of another type of particle, such as at least 2% lower, such as at least 5% lower, such as at least 10% lower, such as at least 15% lower, such as at least 20% lower, such as at least 25% lower, such as at least 30% lower, such as at least 35% lower, such as at least 40% lower, such as at least 45% lower, such as at least 50% lower.

The effectivesness of the sorting may also be influenced by the amount of one type of particles compared to the amount of another type of particles. Accordingly, the weight ratios between one type of particle and another types of particle types is conveniently between 1:1 and 1:1000, such as between 1.1 to 1:500, such as between 1:1 to 1:250,, such as between 1:1 to 1:100,, such as between 1:1 to 1:50, such as between 1:1 to 1:25, such as between 1:1 to 1:10, such as between 1:1 to 1:5.

Figure 2:
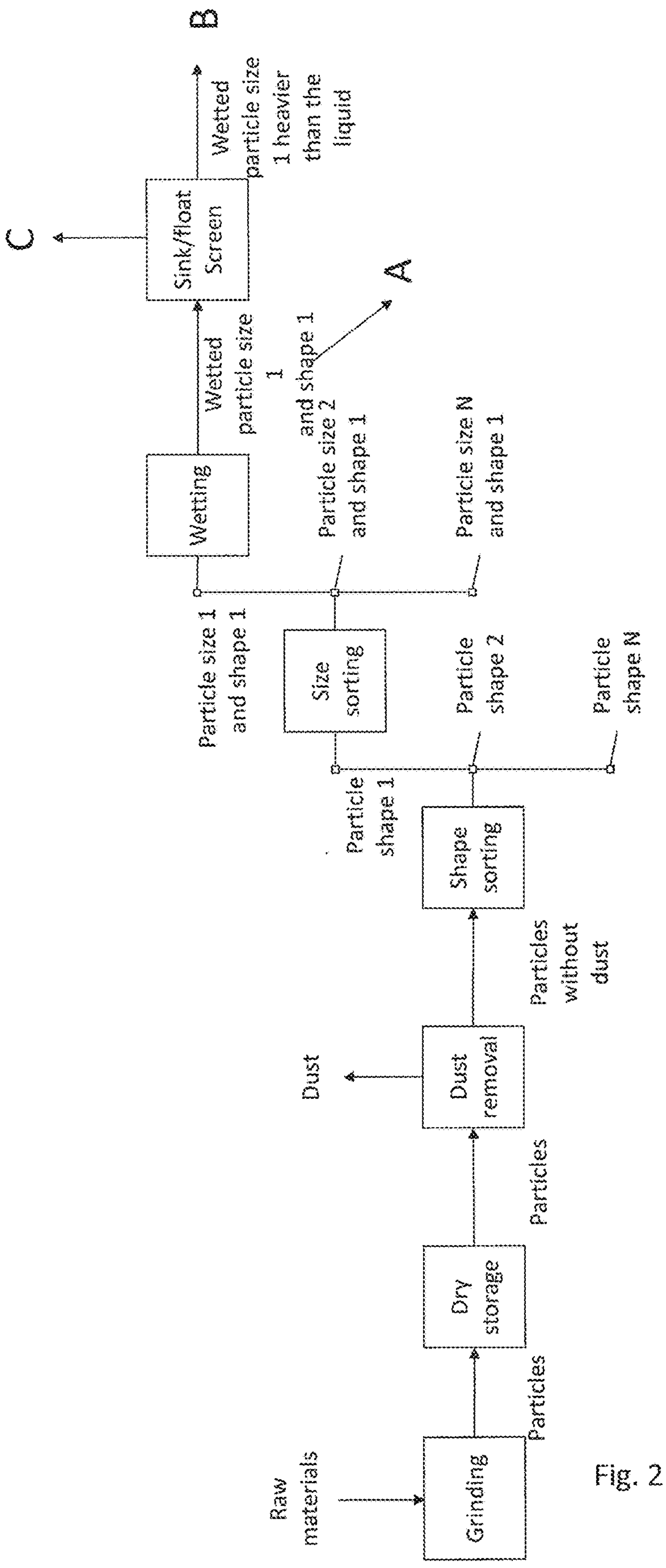
FIG. 2 shows a diagrammatic overview of different steps of the preparation and/or sorting of particles before the stratification.
Figure 3:
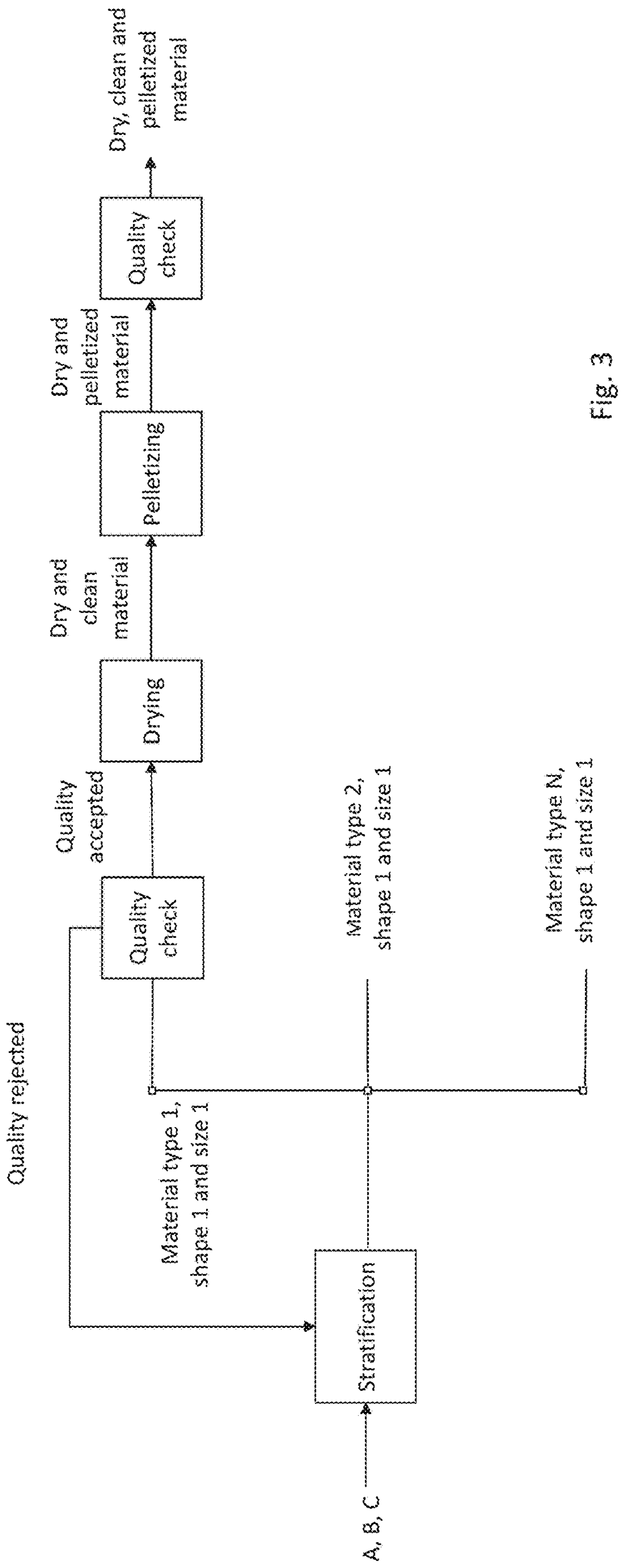
FIG. 3 shows a diagrammatic overview of different steps of the stratification in the stratification system of the invention and the subsequent steps.

The particles to be sorted may originate from discarded products or matter from industrial applications. Typically, the matter to be sorted derives from waste from industrial production and comprises several different types of matter with different fluid-mechanical properties and particle sizes. In some embodiments the particles to be sorted are polymeric waste matter, such as plastic that stems from the production of polymer/plastic containing products. Polymeric/plastic waste matter like this is often a combination of several different types of polymers/plastics of varying particle sizes and densities mixed together. As a result of this, polymer/plastic wastes are very rarely recycled as the melting and reusing of the mixed polymer/plastic waste often results in weak and poor-quality polymer/plastic products due to the mix of different types of polymers/plastics. Consequently, the polymer/plastic waste is usually incinerated in district heating plants or disposed of in landfill sites. However, with the stratification system and method described herein, the polymer/plastic waste matter may be sorted and separated into the different types of polymer/plastic constituents according to their respective densities. This may be achieved by gathering the waste polymer/plastic and processing it on-site or transporting it (as shown in FIGS. 1 and 2) to a different dedicated treatment system or plant at a different location using a stratification system and a method as described in detail below.

In some embodiments the particles to be sorted comprise polymeric waste that comprises two or more types of polymeric matter with different densities. It should be noted that the stratification system and method for sorting particles is not limited to particles comprising only two types of particles of different fluid-mechanical properties but may also be used for particles comprising more than two types of matter with different fluid-mechanical properties, such as more than 3, 4, 5 or more types of matter with different densities. Accordingly in some embodiments the particulate matter comprises more than 2 types of particles, such as up to 5 types of particles, such as up to 10 types of particles. Accordingly, the particles to be sorted can comprise an organic polymer, such as a plastic material. Such, organic polymer can suitabley be selected from PP, PE, PET, POM, PC, ABS, PC-ABS, PEEK, PVC or a combination thereof.

The particulate matter to be sorted may be milled, shredded or pelletized into suitable particle shapes sizes dependent on the ratio of the volume of the particles to be sorted to the volume of liquid in the stratification chamber. This may have the effect of improving the stratification of the particles to be sorted in respective layers in the liquid according to the fluid-mechanical properties of the particles.

Additionally or alternatively, the particulate matter to be sorted may be washed before and/or after the shredding, milling and or pelletizing. The term "pelletize" may be understood as the process of compressing or moulding a material into the shape of a pellet. The term "pellet" may be understood as a small, rounded, compressed mass of a matter. Additionally or alternatively, the particulate matter to be sorted may be pelletized such that the particles are of substantially the same shape and/or size. This may have the effect of further improving the stratification process, as the influence of the shape and/or size of the particles to be sorted is reduced. In attractive embodiments the particles to be sorted has a shape selected from one or more of spherical, near-spherical, cubuoid, rod shaped or flake shaped particles. In particular more than 75% of the particles to be sorted can be spherical, near-spherical, and/or cubuoid for better storing result. In other embodiments the longest diameter or diagonal of the particles to be sorted is between 0.01 mm and 1.000 mm, such as between 0.1 to 500 mm, such as between 1 mm and 10 mm. In alternative embodiments the longest diameter or diagonal of the particles to be sorted, ranges by a factor of less than 100 between the smallest to the largest longest diameter or diagonal, such as less then 50, such as less than 25, such as less than 10. In some embodiments at least 40%, 50%, 60%, 70%, 80%, 90% or 95% of the particles to be sorted may be within the defined range of ratios between the smallest and largest particle sizes. This may have the effect of ensuring an optimum stratification efficiency as the effect of the size difference of particles on the stratification process is kept within limits. The defined range of a ratios may be from a ratio of 1:1 to a ratio of 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:30, 1:40, 1:50, 1:60, 1:70, 1:80, 1:90 or 1:100 between the smallest and largest particle diameter or diagonals.

The effectiveness of the sorting can also be influenced by difference in density between the particles to be sorted and the liquid, and accordingly in some embodiments the density of the particles to be sorted is at least 1% lower than the density of the liquid, such as at least 2% lower, such as at least 5% lower, such as at least 10% lower, such as at least 15% lower, such as at least 20% lower, such as at least 25% lower, such as at least 30% lower, such as at least 35% lower, such as at least 40% lower, such as at least 45% lower, such as at least 50% lower.

The effectiveness of the sorting and the capacity of the stratification system can also be influenced by the hight of the particle bed resting on the sifting devices disclosed herein. A particle bed can be formed both under the lower sider of the first sifting device and/or on the upper side of the second sifting device depending on the fluid mechanical properties of the particles in the liquid. In further embodiments the height of the particle bed in the stratification system in use is between 1 cm and 1000 cm, such as between 5 cm and 500 cm, such as between 10 cm and 100 cm, such as between 20 cm to 50 cm. Particles bed having a height of between 25 cm to 35 cm are particularly interesting.

In even further embodiment the particulate matter and particles as described herein may be similar or the same as the particulate matter and particles described in WO2020/119873 incoporated herein by reference.

Liquid

The liquid in the stratification chamber suitably has properties, such as density or viscosity chosen based on the fluid-mechanical properties, such as densities, of the different types of matter to be sorted. The properties of the liquid may be chosen such that it is the mean of one or more fluid-mechanical properties of the particles to be sorted. Additionally or alternatively, the properties of the liquid may be manipulated by additives, magnetism, physical treatment. Additionally or alternatively, liquids of different properties may be used.

In some embodiments the liquid (300) in the stratification system suitably has a density of between 0.5 g/cm$^3$ and 3 g/cm$^3$.

Suitably the liquid can be water or an aqueous solution, optionally comprising a surfactant (1100) and/or one or more biocides. The surfactant may be added to the liquid to reduce the surface tension in the liquid and the lowered surface tension can have the effect of reducing air in the liquid and thereby improving the stratification process of the particles to be sorted. Biocides can be added to reduce microbial growth and biofilm in the stratification system which would make the sorting less effective. Biocides also allows the recycling of the liquid.

For furthering effectiveness of the sorting process, the volume ratio between the particles and the liquid is above 1:100 (1% particles), such as above 1:50 (2% particles), such as above 1:25 (4% particles), such as above 1:10 (10% particles). In some embodiments the the volume ratio between the particles and the liquid is below 4:1 (80% particles), such as below 2:1 (67% particles), such as 1:1 (50% particles). More specifically in some embodiments the volume ratio is between 1:10 and 1:1.

In even further embodiment the liquid described herein may be similar or the same as the liquid described in WO2020/119873 incoporated herein by reference.

Stratification Chamber

The stratification chamber (100) suitably is in the form of a container having a bottom and one or more side walls (101), and which is capable of containing the movable sifting device(s) (200/202) and the liquid (300) and particulate matter/particles (400/500), as well as being capable of fitting in the movable sifting devices (200/202) and their respective drives systems (600) and allowing for vertical or near vertical up and down movements within the stratification chamber.

The inner shape of the stratification chamber (100) can be a column having a circular, ellipsoid, cubioid or a polygonic base shape. The lower base is located below the first movable sifting device (200) and optionally also below the second movable sifting device (202).

The stratification chamber (100) suitably has a volume of at least 10, 20, 30, 40, 50, 60, 70, 80, 90, 100, 110, 120, 130, 140, 150, 200, 250, 300, 400, 500, 600, 700, 800, 900, 1000, 2000, 3000, 5000, 10000, or 20000 litres.

The stratification chamber (100) suitably has one or more inlets (103) for letting in liquid (300) and/or particulate matter (400) into the stratification chamber (100). Inlets for letting in particulate matter are suitably placed below the first movable sifting device (optionally in its highest position) and optionally above the second sifting device (optionally in its lowest position) thereby allowing the particulate matter to be introduced into the stratification chamber beneath the first movable sifting device and optionally above the second sifting device. Inlet for liquid can be the same as for particulate matter or separate. The particles to be sorted can be added before the liquid, together with the liquid or after the liquid.

Figure 11A:
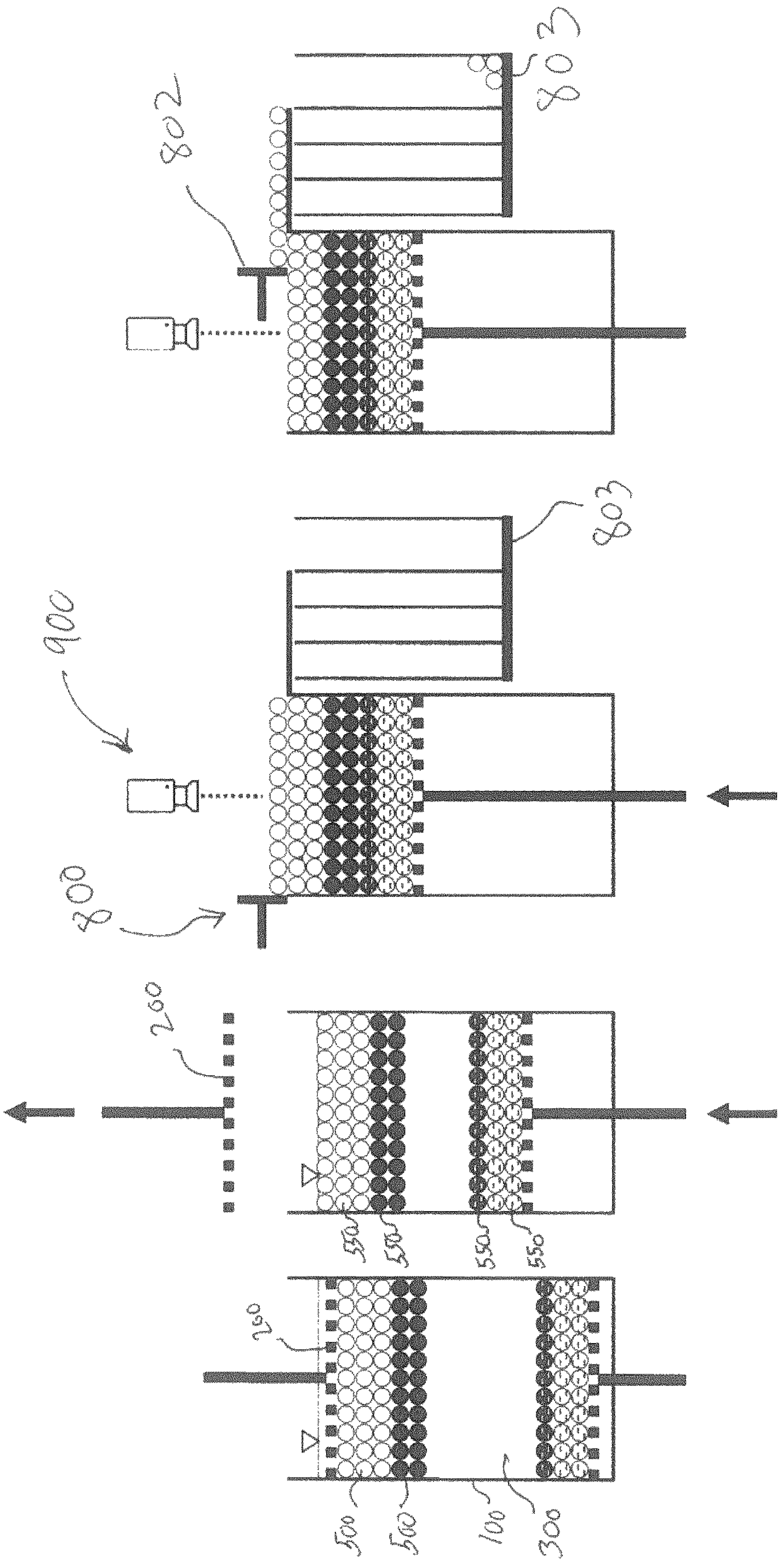
FIG. 11*a* shows a discharge system of the invention, and is additionally illustrating different sequences of discharging particles.
Figure 11B:
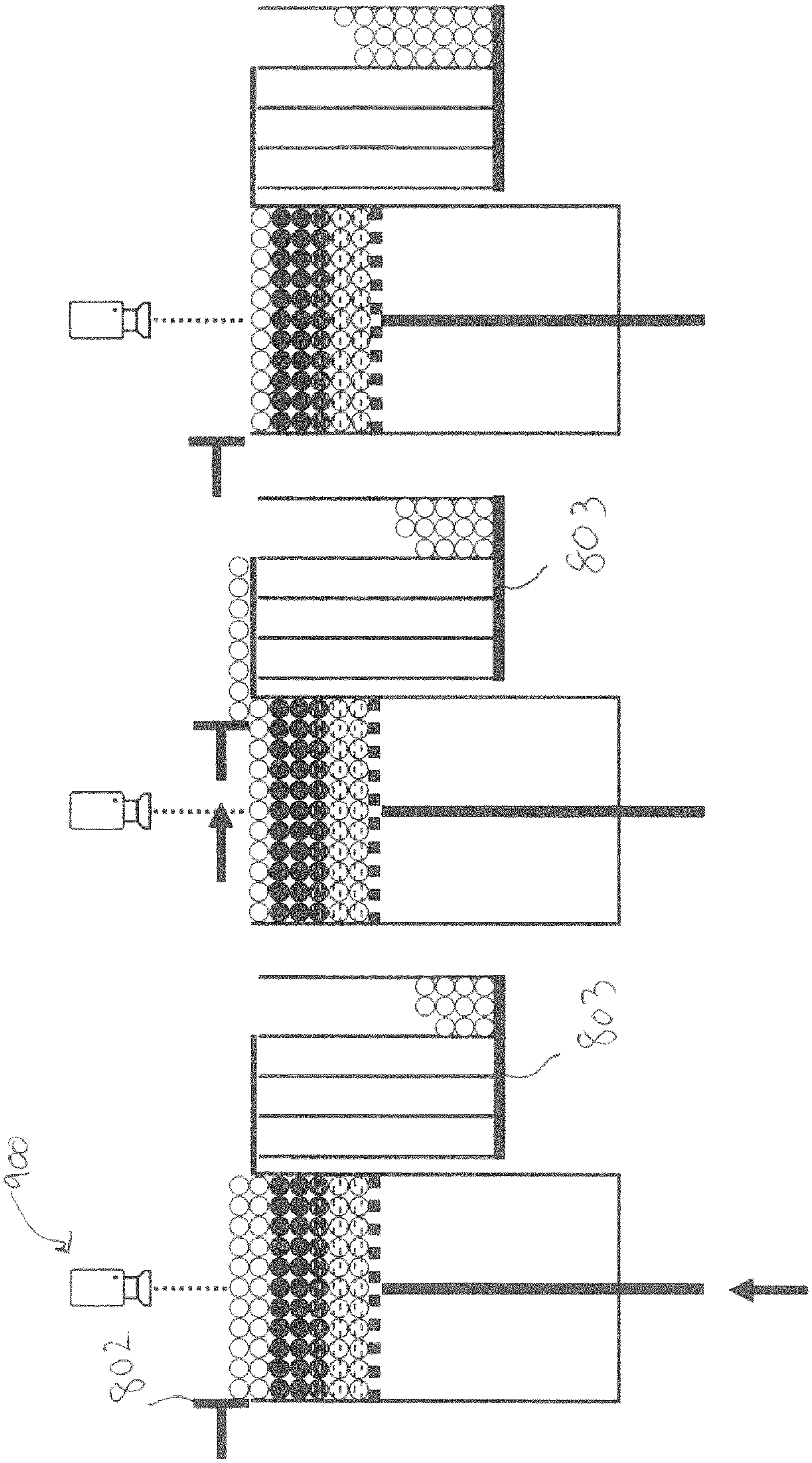
FIG. 11*b* shows a discharge system of the invention, and is additionally illustrating different sequences of discharging particles.
Figure 11C:
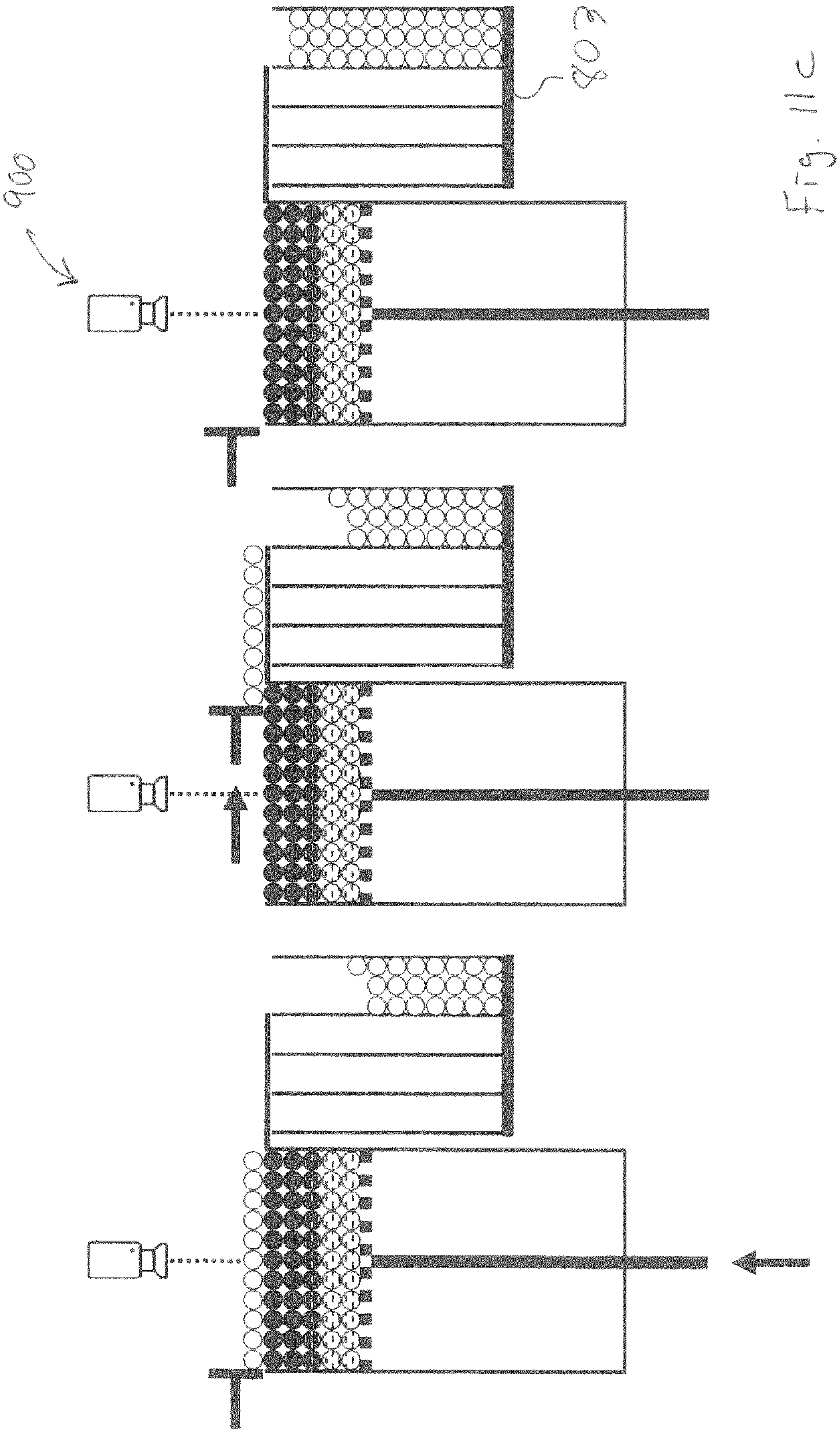
FIG. 11*c* shows a discharge system of the invention, and is additionally illustrating different sequences of discharging particles.
Figure 11D:
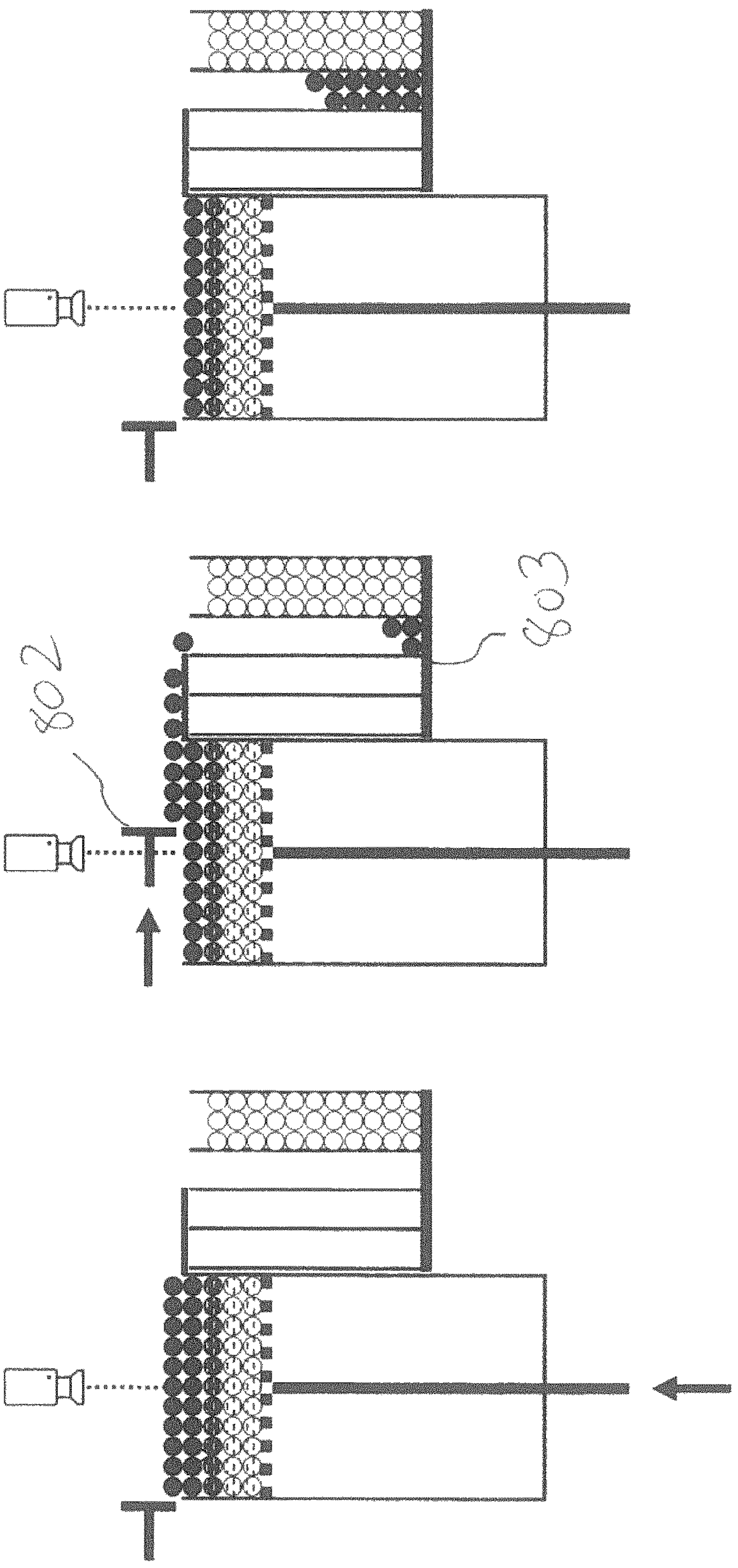
FIG. 11*d* shows a discharge system of the invention, and is additionally illustrating different sequences of discharging particles.
Figure 11E:
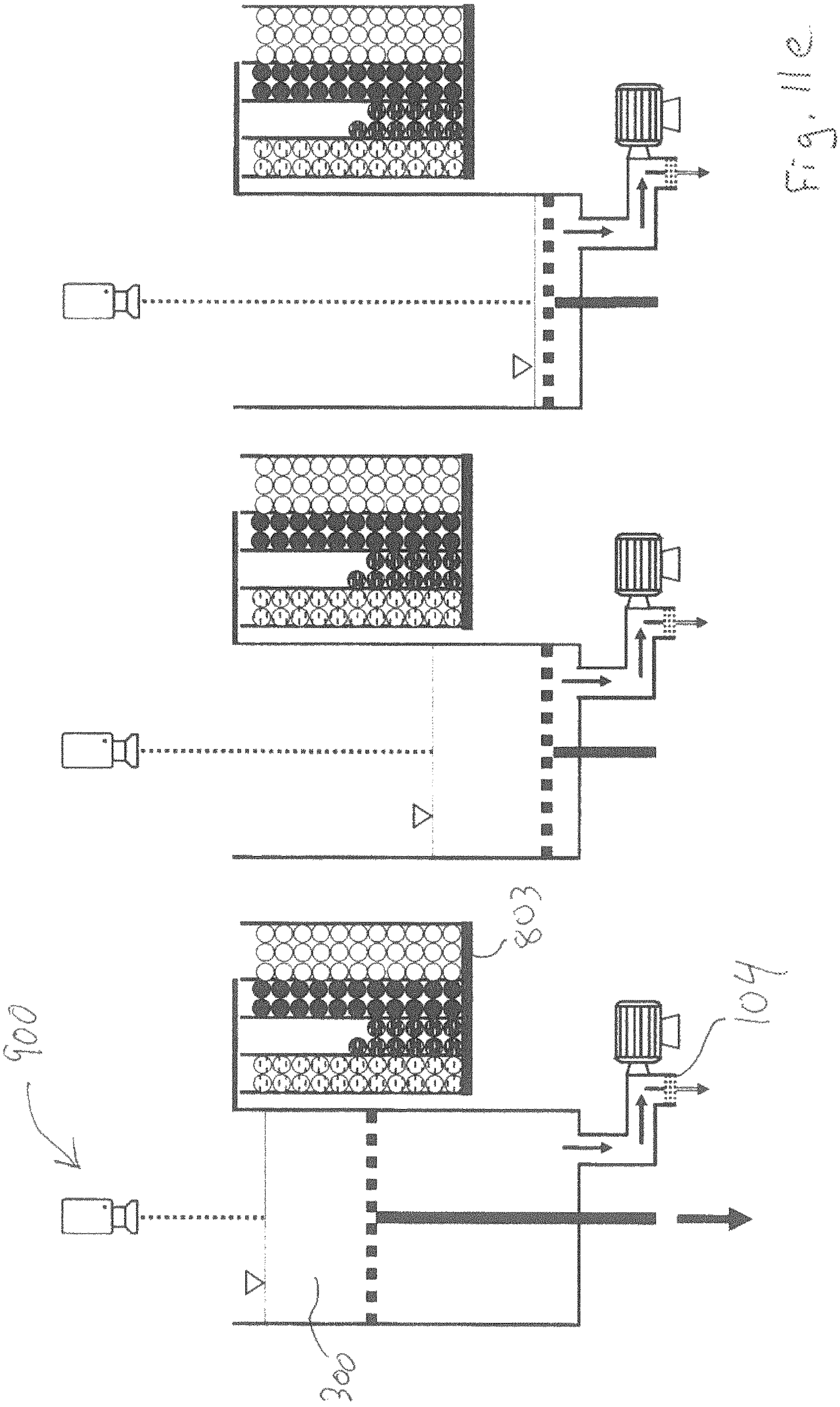
FIG. 11*e* illustrates how the stratification chamber may be emptied for liquid.
Figure 12:
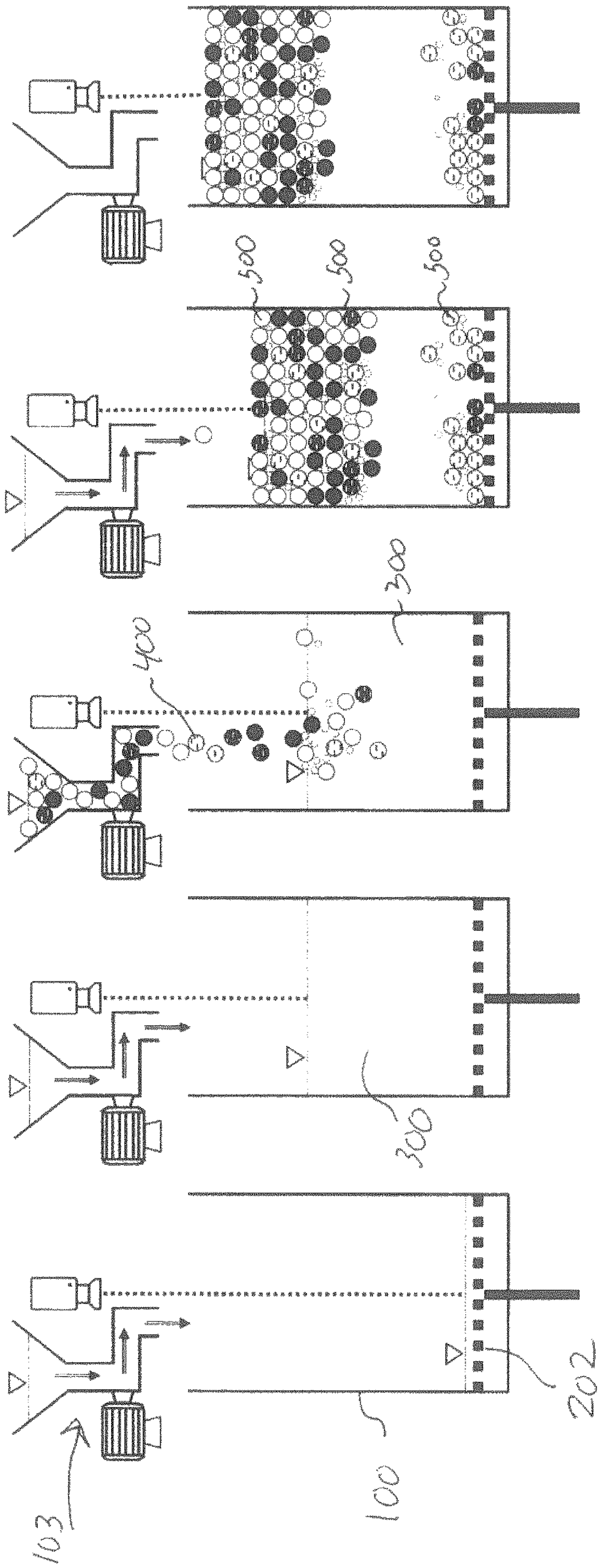
FIG. 12 shows a sequence of filling a stratification chamber of the stratification system with liquid and subsequently filling the stratification chamber with particulate matter.
Figure 13:
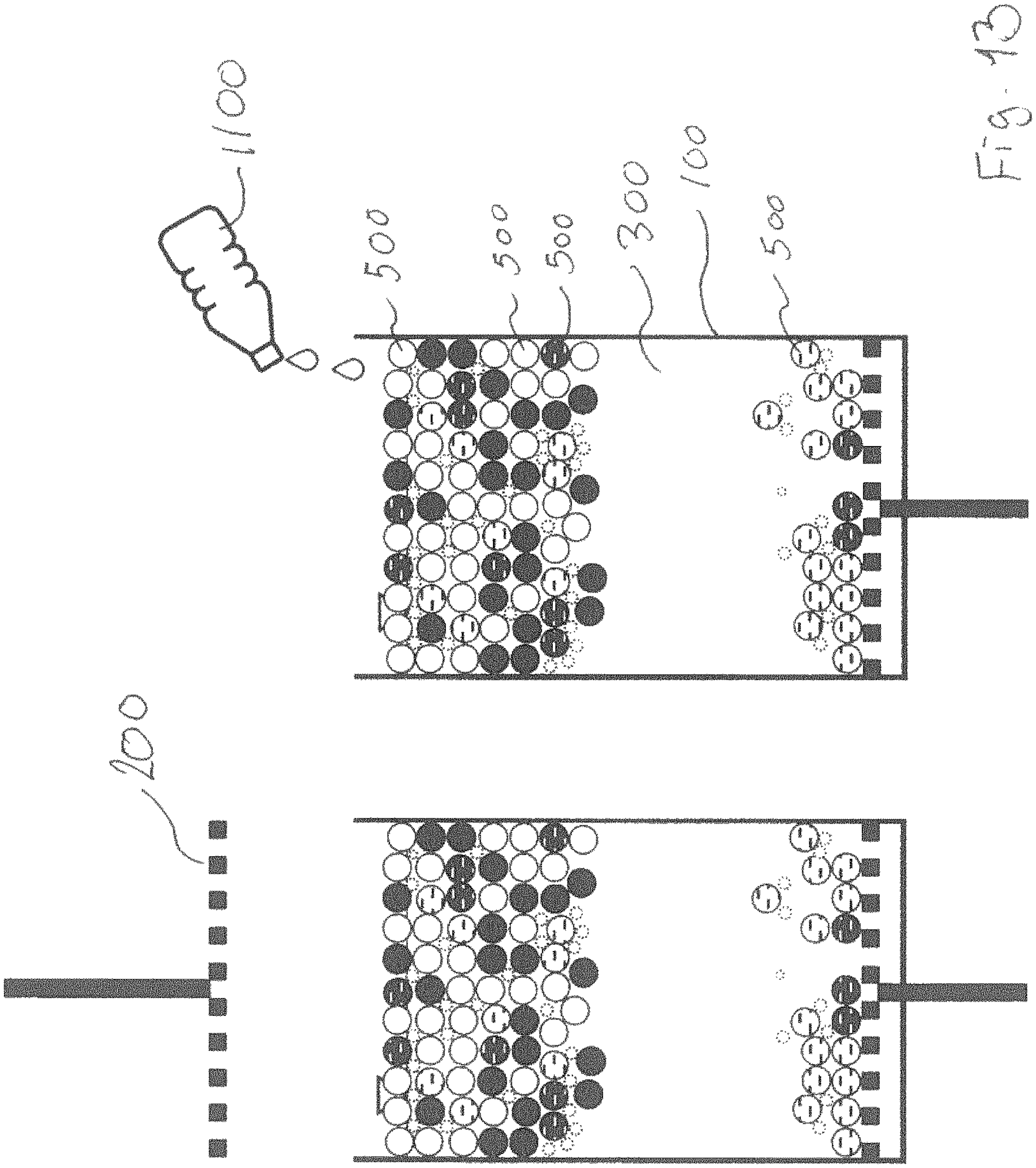
FIG. 13 shows an embodiment of adding a surfactant to the liquid in the stratification chamber.
Figure 14:
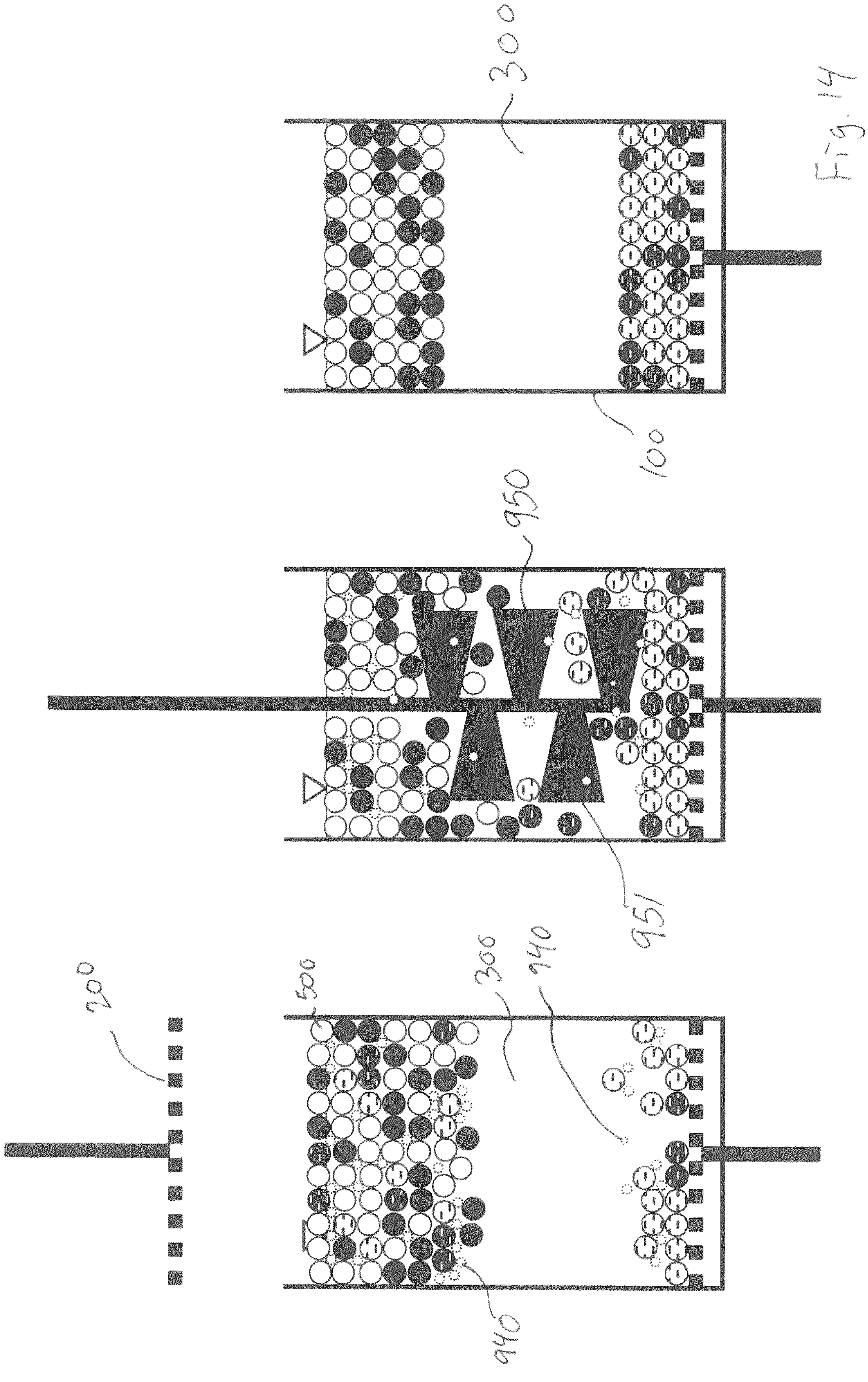
FIG. 14 shows an embodiment of arranging a means for removing gas such as a mixing device inside the stratification chamber.
Figure 15:
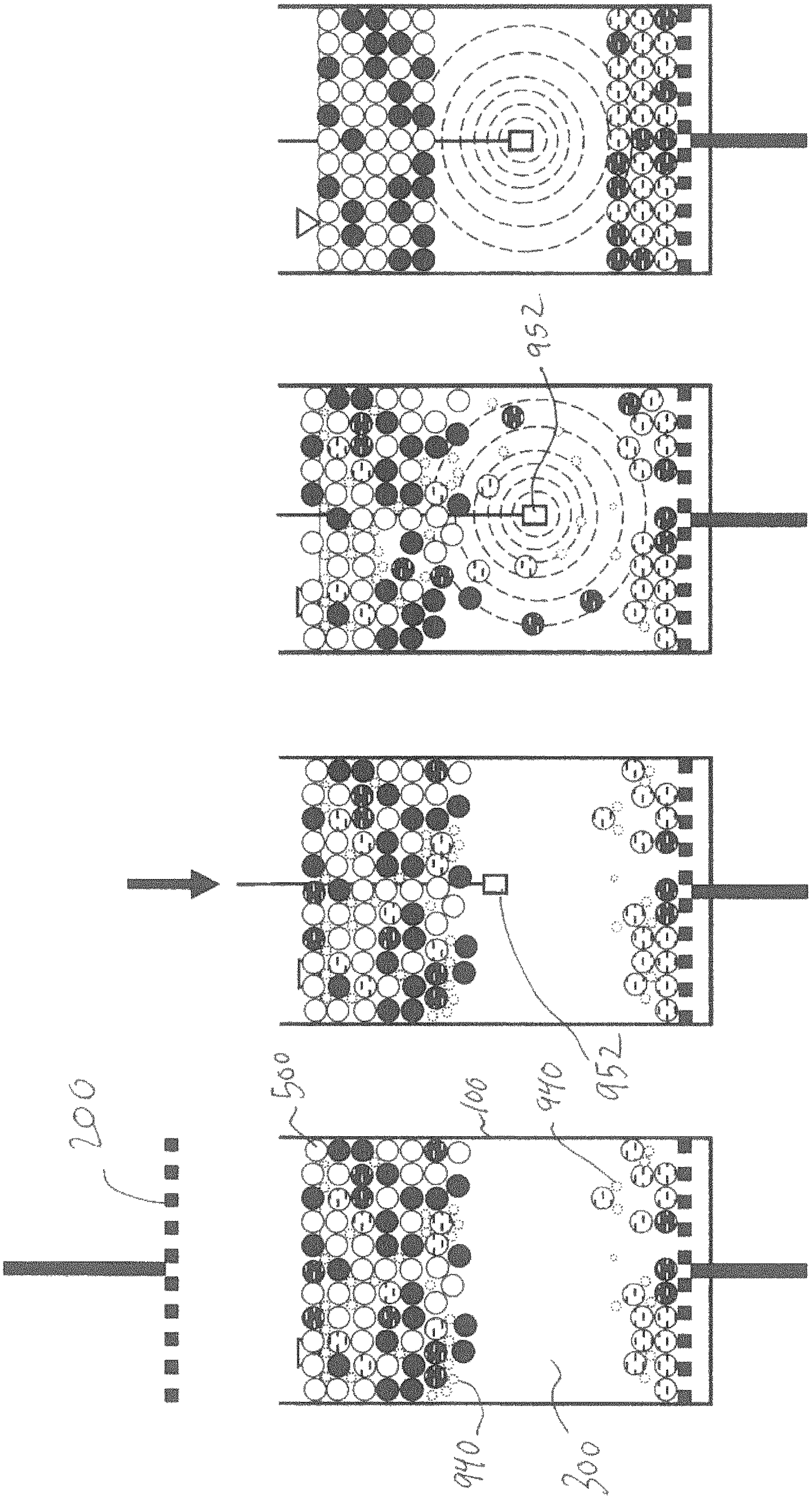
FIG. 15 shows another embodiment of arranging a means for removing gas such as a vibration generating device inside the stratification chamber.
Figure 16:
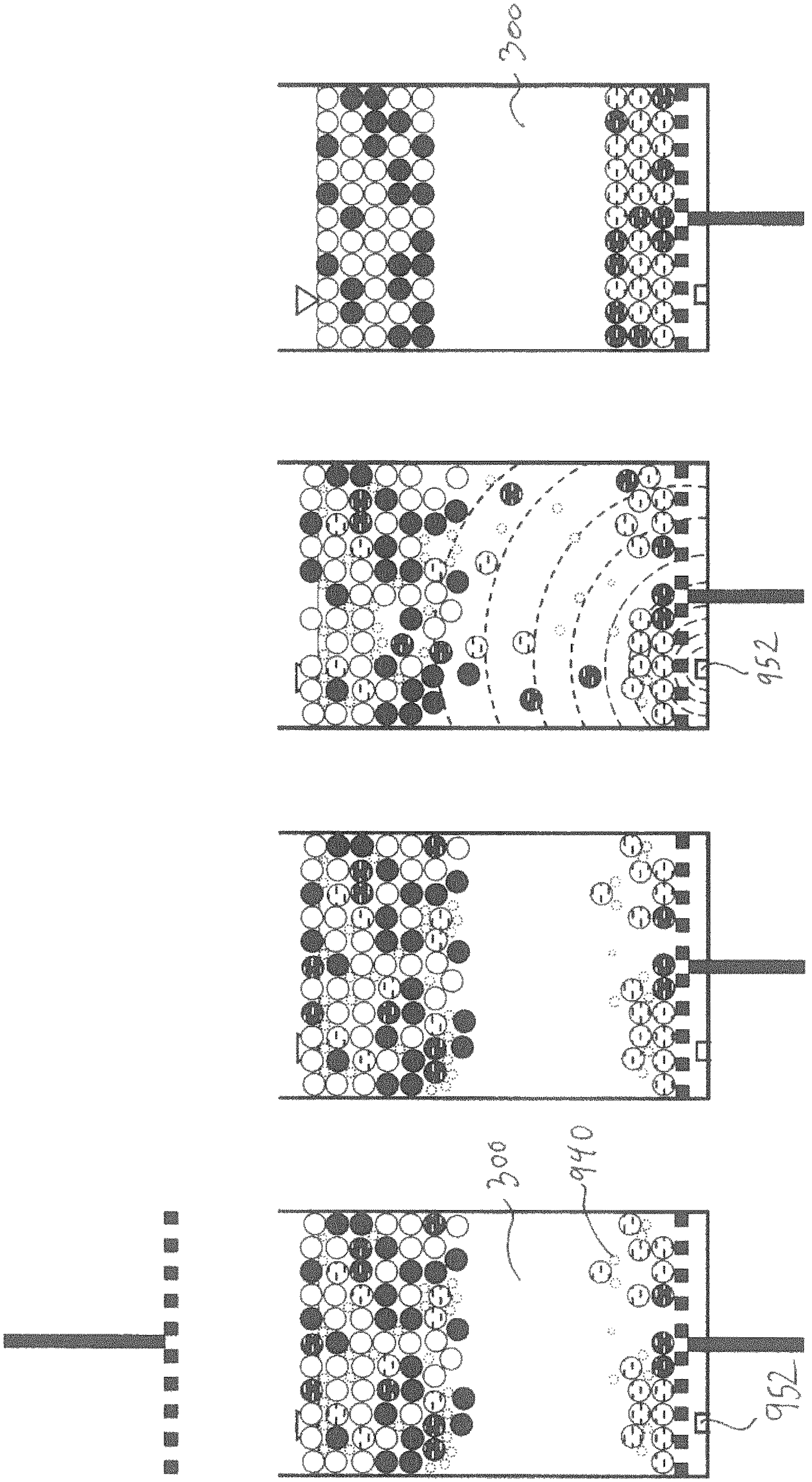
FIG. 16 shows yet another embodiment of arranging a means for removing gas such as another vibration generating device inside the stratification chamber.
Figure 17:
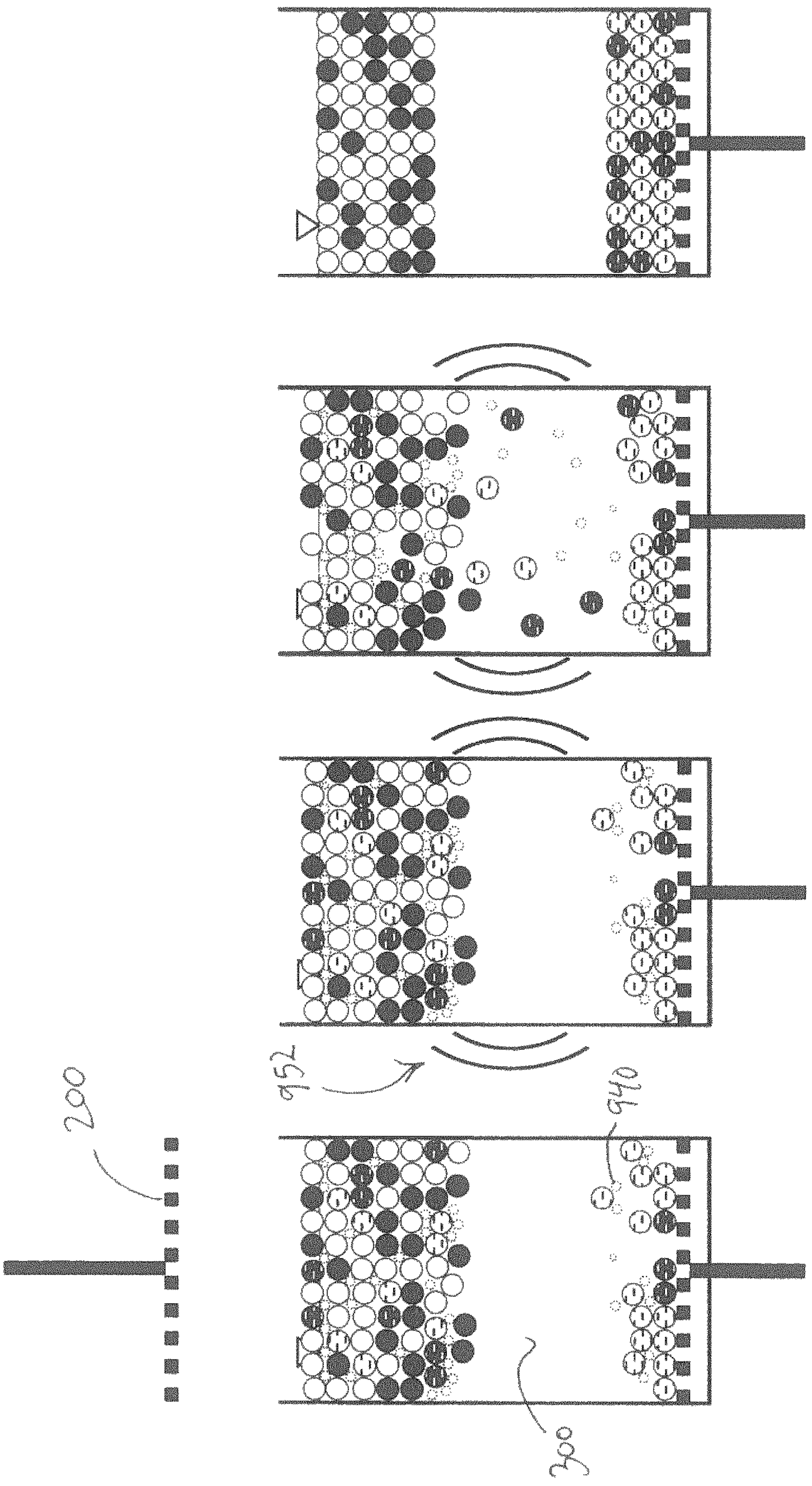
FIG. 17 shows an additional embodiment of arranging a means for removing gas such as a vibration generating device in connection with the stratification chamber.
Figure 18:
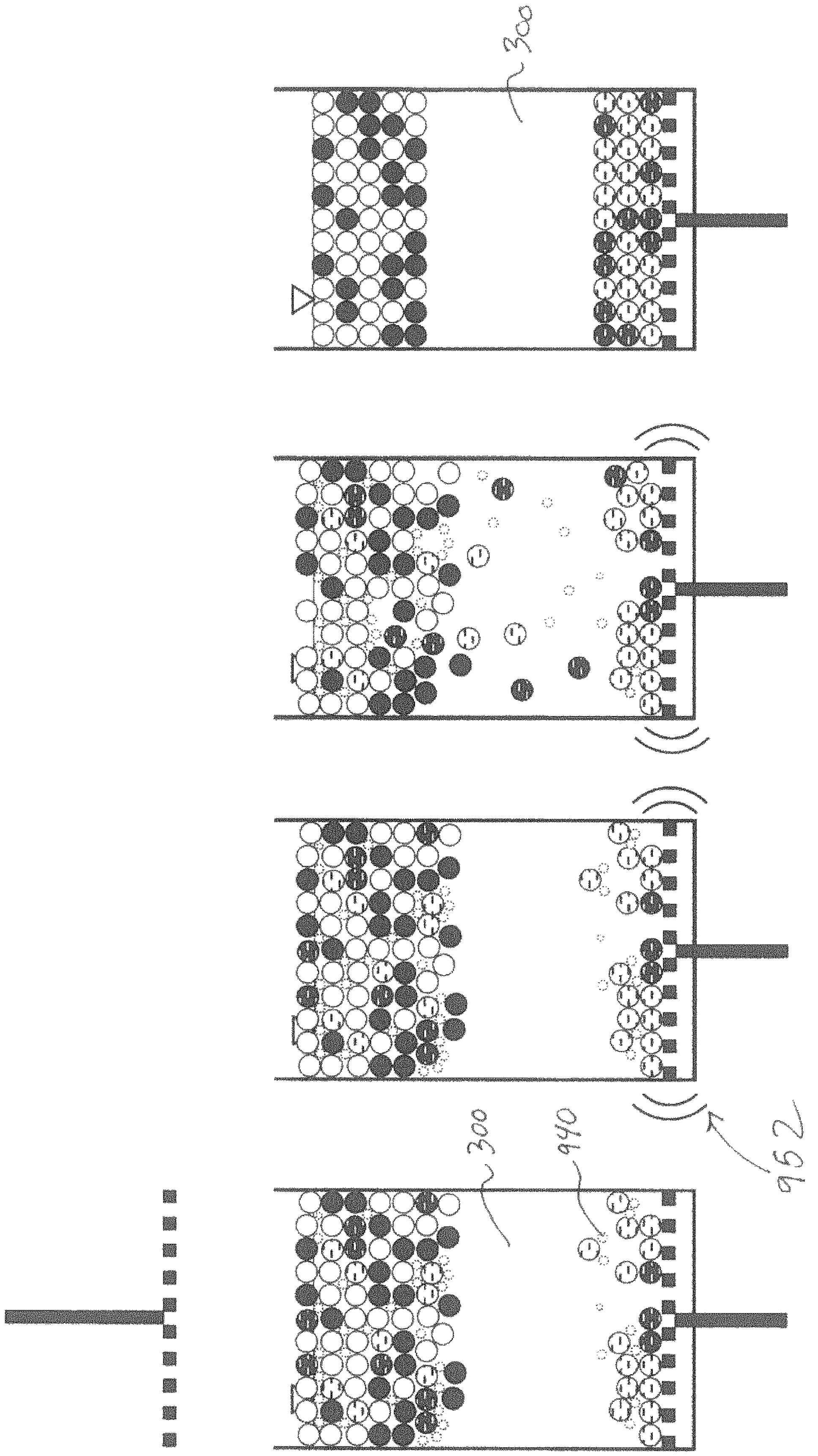
FIG. 18 shows yet an additional embodiment of arranging means for removing gas such as another vibration generating device in connection with the stratification chamber.
Figure 19:
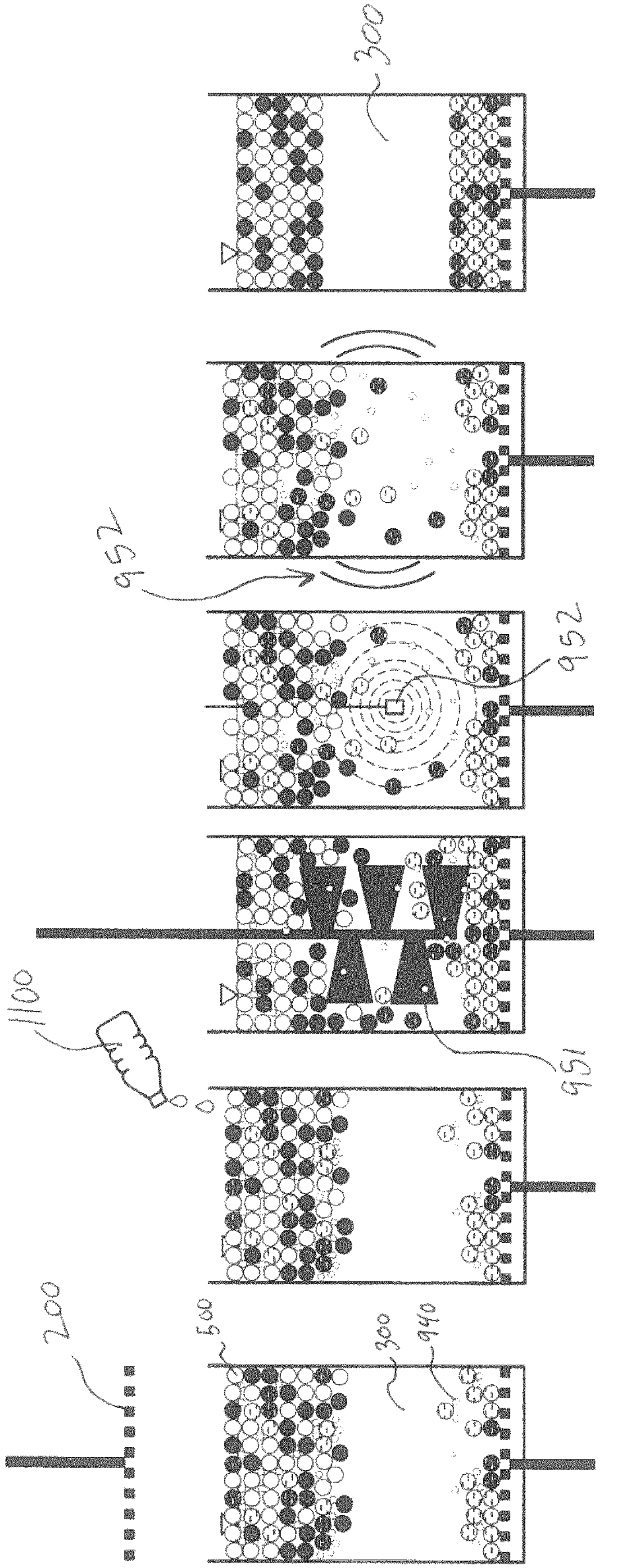
FIG. 19 shows schematically an overview of the different embodiments illustrated in FIGS. 13 to 18 for arranging means for removing gas in the liquid.
Figure 20:
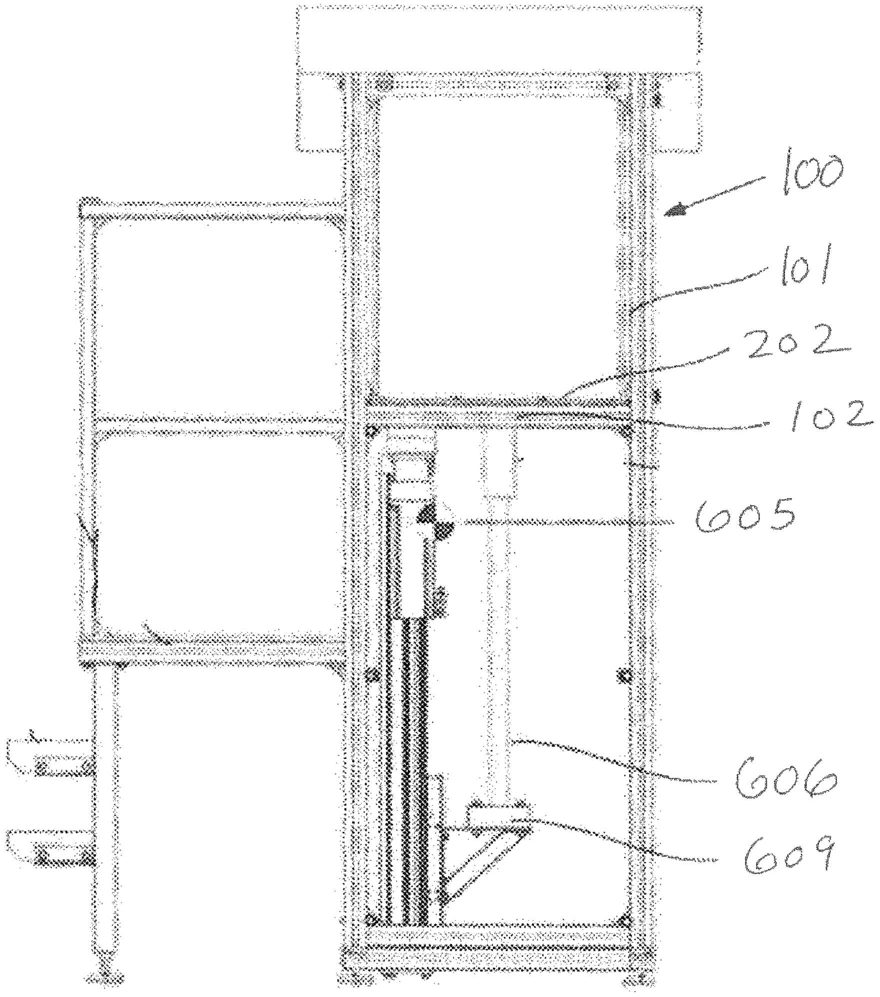
FIG. 20 shows a schematic drawing of an embodiment of the stratification system of the invention, wherein a drive system is shown for moving the second sifting device.

Further the stratification chamber (100) suitably has one or more outlets for letting out liquid and/or particulate matter from the stratification chamber. Outlets (104) for letting out liquid is suitably placed at the bottom of the stratification chamber, optionally below the second sifting device as seen in FIG. 11*e*. Outlets for letting out particulate matter are suitably part of or associated with a discharge system (900), as shown in FIGS. 11*a*-11*e* and placed so that the first sifting device (200) by its drive system (600) or other means can be lifted above the outlet and above a discharge height where the particulate matter can be discharged from the stratification chamber.

In some embodimnets the stratification chamber (100) is designed so that the movable sifting devices substantially seals against the one or more side walls of the stratification chamber. This may have the effect that the particles to be sorted is more effectively moved as substantially all the particles can be moved by the moveable sifting devices without particles bypassing the sifting devices at the edges. Such seals can include at least one lip seal.

Further, the stratification chamber can be fluidly connected with a fluid compensation system below the first movable sifting device and configured for delivering and receiving a liquid to and from the container and/or stratification chamber, whereby liquid can be supplied to the stratification chamber, when the volume below the first movable sifting device is increased by upwards movement of the first movable sifting device, and liquid can be received from the stratification chamber, when the volume below the first movable sifting device is decreased by downwards movement of the first movable sifting device. Similarly, liquid can be supplied to the stratification chamber, when the volume below the second movable sifting device is increased by upwards movement of the second and/or first movable sifting device, and liquid can be received from the stratification chamber, when the volume below the second movable sifting device is decreased by downwards movement of the second movable sifting device.

Figure 21:
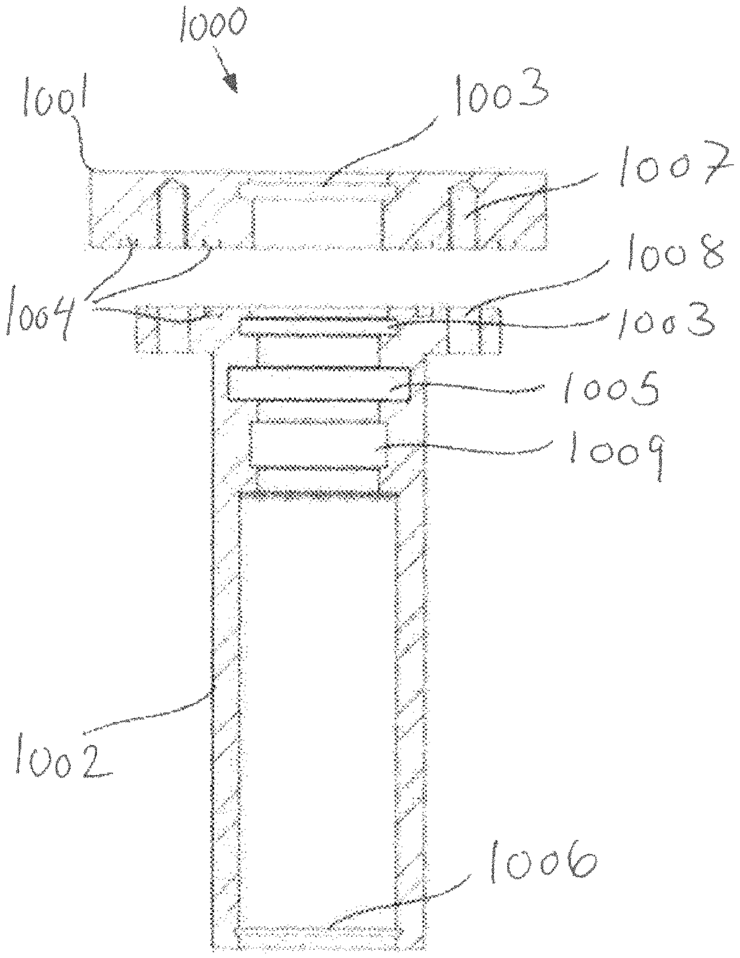
FIG. 21 shows in a cross-sectional view an embodiment of a chamber seal for use in the stratification system of FIG. 20.
Figure 22:
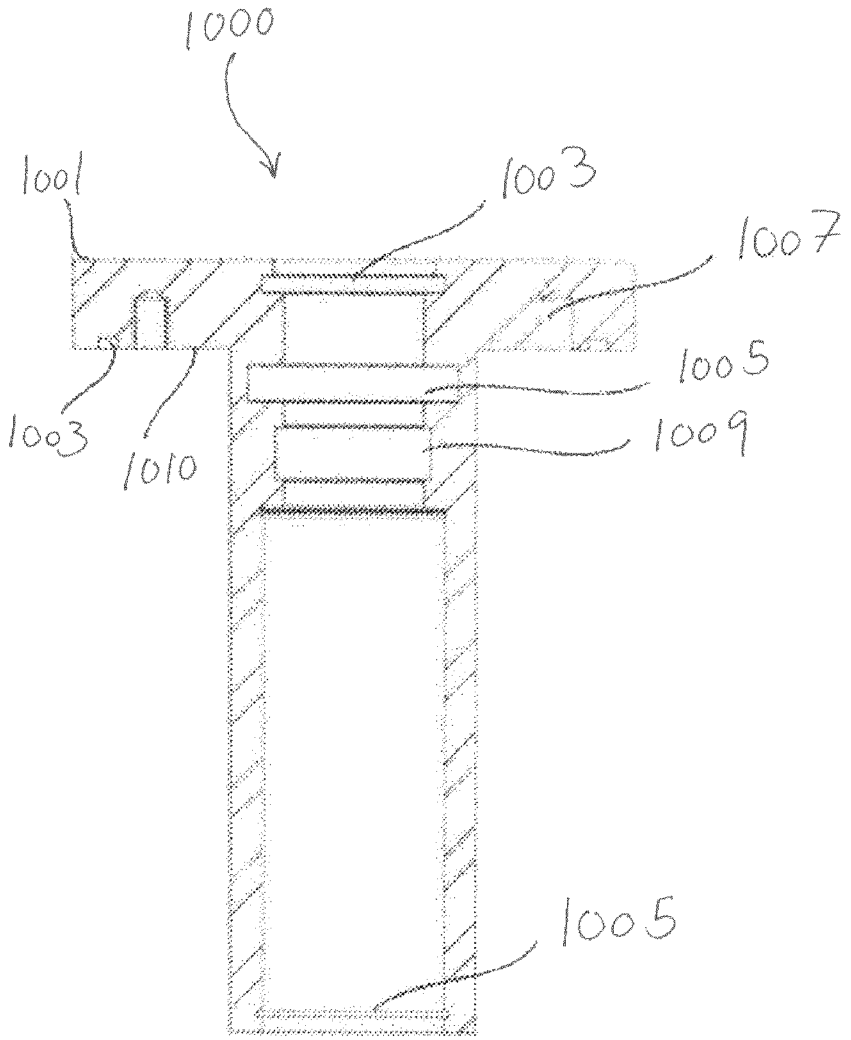
FIG. 22 shows in a cross-sectional view an additional embodiment of a chamber seal for use in the stratification system of FIG. 20.

The stratification chamber may in addition to inlet and outlets further comprise one or more sealed openings allowing movable drive shafts of the drive systems to penetrate one or more walls of the stratification chamber. Such sealed openings are suitably designed to allow the driving shaft to move and operate during the sorting process, while at the same time sealing off the stratification chamber from the external environment. Such sealed openings may be cylindrical or any other shape fitting in the drive shaft and the seal. As shown in FIGS. 21 to 22, the sealed opening may comprise a top housing body (1001) and a bottom housing body (1002). The top housing body (1001) and the bottom housing body (1002) may be detachably interconnected by fastening means such as bolts, screws, adhesives, screw thread and the like. The sealed opening may further comprise one or more threaded holes (1007). The sealed opening may further comprise one or more through holes (1008). The sealed opening comprises one or more sealing elements, optionally in the form of a wiper seal (1003), a rod seal, a o-ring seal or the like. A "wiper seal" is to be understood as a sealing element that maintains sealing contact with the shaft when the shaft is stationary (static, no reciprocating motion of shaft) and moving (dynamic, reciprocating motion of shaft). A "rod seal" is to be understood as a sealing element that maintains sealing contact in sliding motion between the chamber seal and the shaft. The rod seal can further comprise a lubricating film. An "o-ring seal" is to be understood as a ring-shaped mechanical sealing element with a round cross-section. The sealing elements may be housed in the sealed opening. The one or more sealing elements may be housed in the top and/or bottom housing body. The one or more sealing elements may be substantially identical or may be different from each other. The one or more sealing elements can be made wholly or in part from natural or synthetic rubber such as BR, NBR, HNBR, EPDM, SiR or the like; from metal such as steel, stainless steel, aluminium, brass, copper or the like; from polymers such as PTFE, PE, TPU, TPE, LDPE, HDPE, LLDPE, ULDPE or the like or from a combination thereof.

The sealed opening may in some embodiments comprise one or more flanges as well as one or more guide elements for guiding a drive shaft. The one or more guide elements may be in the form of guide rings (1009), linear guides such as linear ball bearings, friction guides or the like. A "guide ring" is to be understood as a ring-shaped guiding element which guides a shaft. The guide ring may prevent contact between shaft and chamber seal (1000).

The sealed opening may in some embodiments further comprise one or more o-ring seals (1004) for the sealing between the sealed opening and the stratification chamber. Further, in some embodiments the sealed opening may comprise one or more wiper seals (1003) and/or one or more rod seals (1005) for sealing between the sealed opening and a drive shaft. Further, in some embodiments the sealed opending may comprise one or more guide elements for guiding the shaft. Such guide elements may be in the form of a rod guide ring (1009) and/or linear ball bearings. Still further, in some embodiments the sealed opending may comprise means for retaining and/or fixating the seals and/or guide elements in the sealed opening.

The housing of the sealed opening can be placed and seals against the inside or the outside of a stratification chamber wall or there can be housings sealing on on both sides of a stratification chamber wall. Alternatively, one part of the housing can be placed and seals against the inside of a stratification chamber wall while the other part of the housing is connectivly placed and seals against the outside of the stratification chamber wall.

In one embodiment the seal between the shaft and the sealed opening comprises one or more wiper seals, one or more guide rings, one or more rod seals and one or more linear guides.

In even further embodiments the stratification chamber as described herein may be similar or the same as the stratification chamber described in WO2020/119873 incoporated herein by reference.

Sifting Devices

The stratification system described herein comprises a first and optionally a second movable sifting device. The first and optionally second movable sifting device as described herein can be any sifting device suited for both allowing the liquid in the stratification system to pass through the sifting device, while retaining at least in part the particulate matter to be sorted, and suited for mounting on a drive system moving the sifting devices, The sifting device is also resilient to withstand the strain/stress caused by the upwards and downwards movements required for sorting the particulate material.

The first sifting device (200) may have the same or mirrored design as the optional second sifting device (202) or they may be different in design.

The sifting devices described herein can be be made of suitable materials providing desired properties such as durability, flexibility and workability, such as metal, synthetic or natural polymers, or mineral materioals or composites thereof.

In some embodiment the sifting devices comprise a porous sieve such as a metal sieve or grid having sieve openings allowing the liquid to pass the sieve while retaining particulate matter having a certain minimum size. In a special embodiment the sifting device is a plate sieve, optionally made made from metal or synthetic polymer or a combination thereof, comprising through holes or openings of a desired dimension.

In some embodiments the sifting device is a plate sieve having sieve through-holes or openings with a longest diameter or diagonal smaller than a predetermined minimum particle size of the particulate matter to thereby retain the particulate matter having a size larger than the minimum particle size within the stratification chamber below the lower surface of the first movable sifting device and optionally above the upper surface of the second movable sifting device.

In other embodiments the sifting device comprises a porous material having pores with a longest diameter or diagonal smaller than a predetermined minimum particle size of the particulate matter to thereby retain the particulate matter having a size larger than the minimum particle size within the stratification chamber below the lower surface of the first movable sifting device and optionally above upper surface of the second movable sifting device.

In further embodiments the devices described herein have an outer edge or edges being closely positioned to one or more side walls of the stratification chamber during the vertical or near-vertical movements, wherein the distance between the outer edge(s) of the sifting device and the one or more sidewalls is smaller than a predetermined minimum particle size of the particulate matter. More specifically the distance between the outer edge of the sifting device and the side wall is suitably 0 mm to 5 mm, such as between 0 mm to 2.5 mm.

In some embodiments sifting device has an upper or lower surface area between 0.1 $m^2$ to 100 $m^2$, such as from 1 $m^2$ to 25 $m^2$.

Second Sieve

Figure 4:
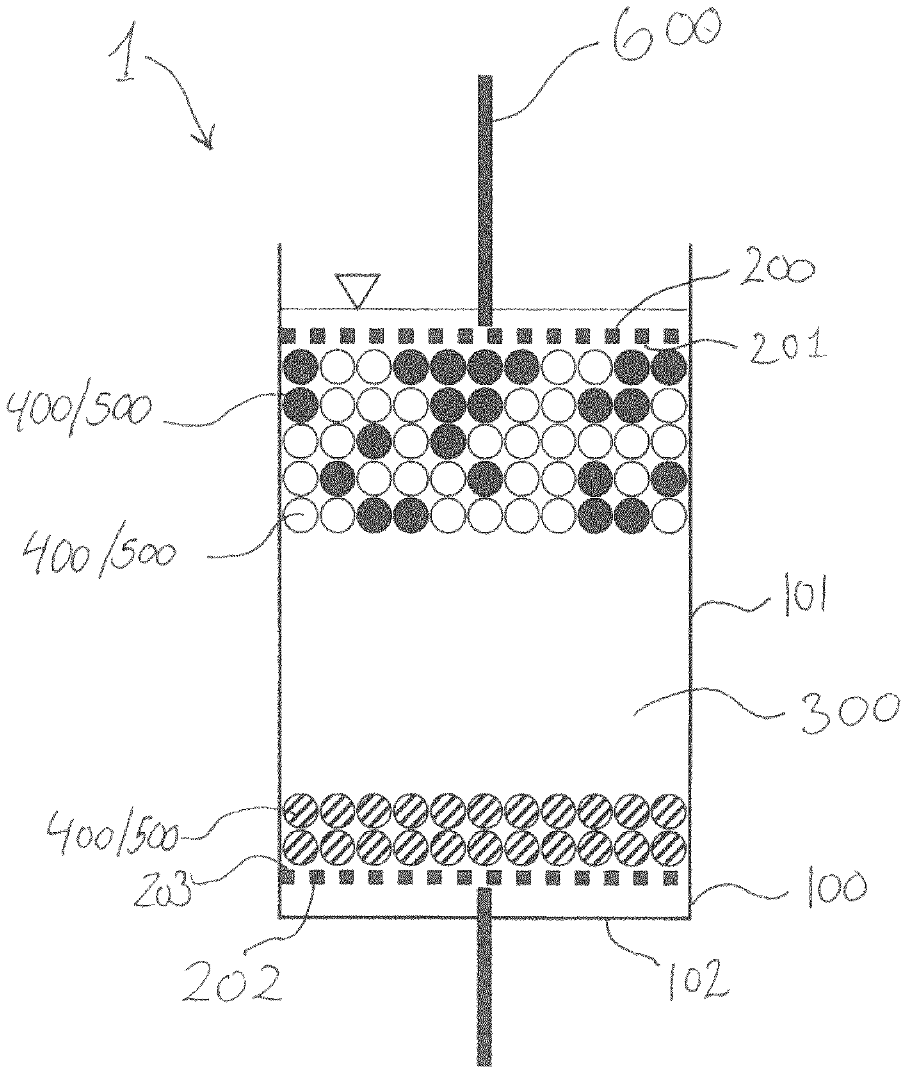
FIG. 4 shows an embodiment of a stratification system of the invention.
Figure 5:
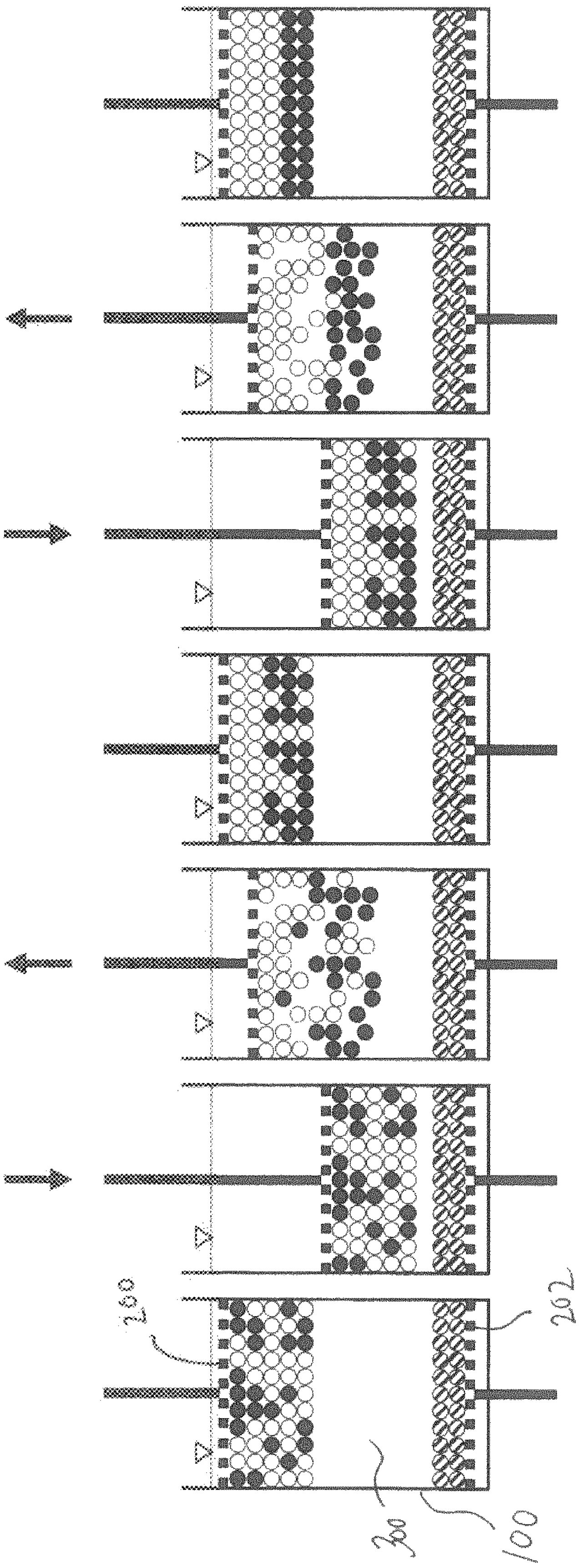
FIG. 5 shows different embodiments of stratification sequences of particles in the embodiment of the stratification system of FIG. 4.
Figure 6:
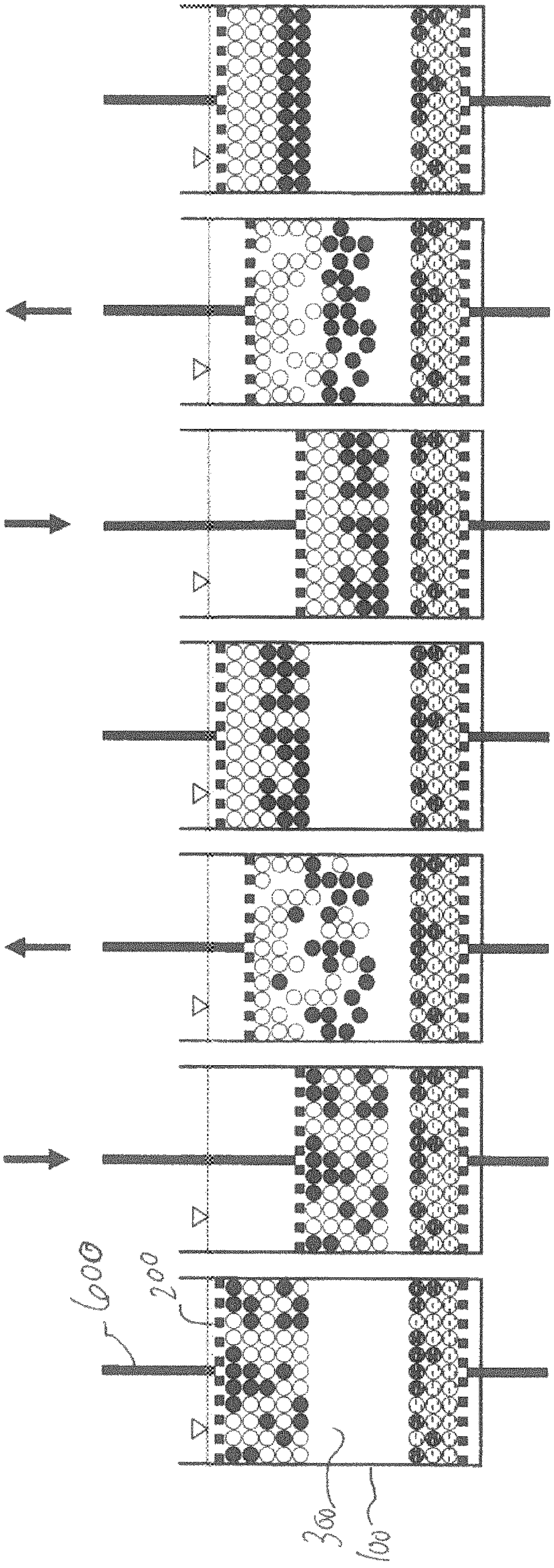
FIG. 6 shows different embodiments of stratification sequences of particles in the embodiment of the stratification system of FIG. 4.
Figure 7:
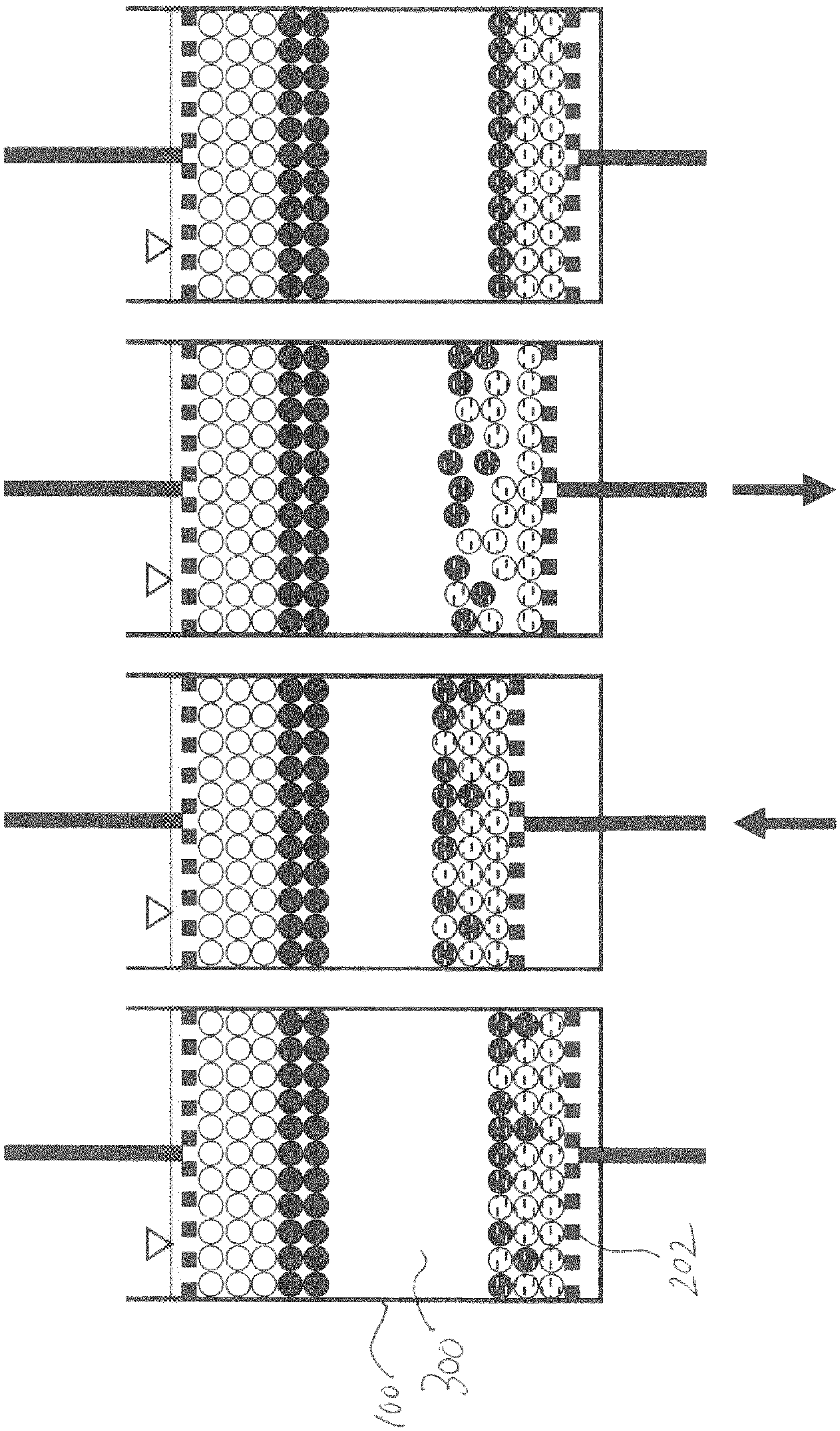
FIG. 7 shows different embodiments of stratification sequences of particles in the embodiment of the stratification system of FIG. 4.
Figure 8:
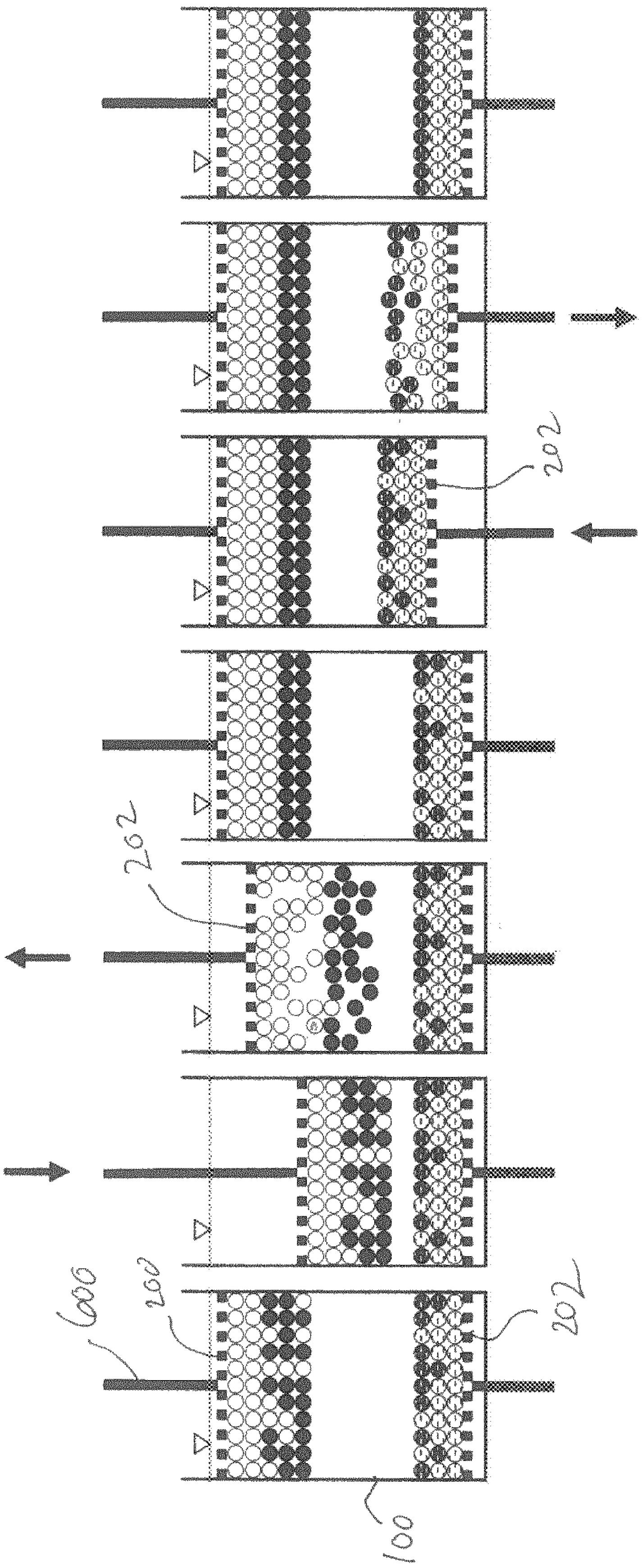
FIG. 8 shows different embodiments of stratification sequences of particles in the embodiment of the stratification system of FIG. 4.

In some embodiments the stratification system described herein further comprises i) a second movable sifting device (202) configured for vertical or near-vertical up and down movements within the stratification chamber (100), wherein the second movable sifting device allows the liquid of the composition to be treated to pass through, while not allowing particulate matter (larger than a certain minimum size) in the composition to the treated to pass, during said vertical or near-vertical movements; and j) a second drive system for moving the second movable sifting device in vertical or near-vertical upwards and downwards movements within the stratification chamber whereby the particulate matter within the liquid is treated;

wherein the second drive system is configured for positioning the second sifting device (202) so that an upper surface (203) of the second movable sifting device is below the particulate matter in the composition to be treated and whereby particulate matter in contact with the upper surface of the second movable sifting device is moved upwards in the stratification chamber by the upwards movement of the second movable sifting device, thereby treating the composition as seen in FIG. 4.

While the first drive system is configurable for lifting the first movable sifting device (200) above a discharging height, at which height the particles, wholly or in part, can be discharged, the second drive system may be configurable for lifting the second movable sifting device 202 and placing particles resting on the second movable sifting device's upper surface at the discharging height, said discharging height being a height where at the sorted particles, wholly or in part, is lifted above the surface of the liquid.

In even further embodiment the second sifting device 202 described herein may be similar or the same as the sieve described in WO2020/119873 incoporated herein by reference.

Drive System

The drive system (600) described herein is capable of providing for the vertical or near-vertical movements of the sifting devices within the stratification chamber. The first and optionally the second drive system described herein comprise a drive engine (605) connected via a drive shaft (606) to the first and optionally the second sifting device.

In some embodiments the drive engine can comprise a linear drive or positioning drive. The linear drive and/or positioning drive can comprise an (electric) motor (605) and/or linear guide.

The drive system may further comprise one or more control units configured for controlling and/or adjusting the motion parameters of the moveable sifting devices. The control units may control and/or adjust both the predetermined sorting motion of the moveable sifting devices and the motion of the moveable sifting devices during the sorting process.

In an embodiment the predetermined sorting motion comprises a series of vertical or near-vertical upstrokes and vertical or near-vertical downstrokes through the liquid in the stratification chamber (100). The amplitude of the upstrokes and/or downstrokes may be different and may be adjusted over time. The velocity of the upstrokes and/or downstrokes may be different and may be adjusted over time. The acceleration of the upstrokes and/or downstrokes may be different and may be adjusted over time. Similarly, successive upstrokes may be different from each other, and successive downstrokes may be different from each other. This may provide an improved stratification process as the motion parameters of the upstrokes and downstrokes may be chosen for optimum efficiency for given types of liquids and particulate matter and state of stratification. The term "upstrokes and/or downstrokes may be different" used herein is to be understood as one upstroke and/or downstroke exhibits one type of vertical or near-vertical motion, while another upstroke and/or downstroke exhibits a different type of vertical or near-vertical motion i.e. the motion parameters such as the amplitude, velocity, acceleration and/or pauses at the end or beginning of a stroke, is different.

In some embodiments the parameters of the predetermined sorting motion may be adjusted based on the types of particles to be sorted, based on the ratio of volume of particles to be sorted to the volume of liquid in the stratification chamber, or based on the height of the particle bed. This may have the effect of allowing the stratification process to be optimized for optimum efficiency based on (i) the type of particles to be sorted, (ii) the ratio between the volume of particles to be sorted and the volume of liquid in the stratification chamber, and/or (iii) the height of the particle bed. The parameters of the predetermined sorting motion may also be adjusted during the sorting process, for example, towards the end of a sorting cycle.

In other embodiments the duration of the stratification process may be adjusted according to the number of upstrokes and downstrokes. Furthermore, the duration of the stratification process may be adjusted according to cycle time, i.e. the time from initiating the stratification until the time of completion of the stratification process. The term "adjusted over time" used here is to be understood as changed over time e.g. changed during the sorting process as time progresses. Further elements of this embodiment include that the amplitude of an upstroke and/or downstroke is adjustable according to the ratio of volume of particles to be sorted to the volume of the liquid in the stratification chamber. This may have the effect of improving the stratification process of the particles to be sorted as different amplitudes of the upstrokes and downstrokes may influence the efficiency of the stratification, particularly in relation to the volume of the particles to be sorted, more specifically the ratio of the volume of particles to be sorted to the volume of liquid in the stratification chamber. Experimental results points towards, that the most effective stroke amplitude, in terms of cycle time and settling of the particles ((400/500)), seems to be dependent on the volume of the particulate/granular material and the volume of the fluid in the stratification or stratification chamber. The higher the volume of the particles to be sorted, the higher the solid volume fraction, which may have the effect of decreasing the mean settling velocity of the particles (hindered settling) and thus reducing the stratification efficiency.

Additionally or alternatively, the acceleration of the upstroke and/or downstroke may be adjusted according to the ratio between the volume of particles to be sorted and the volume of the liquid in the stratification chamber. This may have the effect of further improving the efficiency of the stratification process, as the acceleration of the upstroke and/or downstroke has been found to have a significant impact on the stratification process. Being able to adjust the acceleration of the upstroke and/or downstroke according to the ratio between the volume of the particles to be sorted and the volume of liquid in the stratification chamber may have the effect of allowing the stratification process to be optimised for optimum efficiency for a given load scenario.

Additionally or alternatively, the velocity of the upstroke and/or downstroke may be adjustable according to the ratio between the volume of particles to be sorted and the volume of the liquid in the stratification chamber. The velocity of an upstroke and/or downstroke may be adjustable according to the ratio between the volume of particles to be sorted and the volume of the liquid in the stratification chamber. This may have the effect of allowing the stratification process to be further optimised and so improving the efficiency of the sorting method.

The term "load" as used herein is to be understood as the volume of particles to be sorted and the volume of liquid in the stratification chamber.

Additionally or alternatively, there is a pause between completing an upstroke and/or downstroke and initiating the following downstroke and/or upstroke. This may have the effect of improving the efficiency of the stratification process. A pause between completing an upstroke and/or a downstroke and initiating the following downstroke and/or upstroke can improve the settling of the particles to be sorted into respective layers in the liquid according as governed by the fluid-mechanical properties of the particles, and thus improving the stratification process. Experimental results point towards that a pause between the upstroke and/or downstroke and the the following downstroke and/or upstroke is highly important for efficient stratification of the particles. In some embodiments, the pause between completing an upstroke and/or downstroke and initiating the following downstroke and/or upstroke is at least 0.5 second. The pause between an upstroke and/or downstroke and the following downstroke and/or upstroke can be at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140 or 150 seconds.

Accordingly, in some embodiments, in the stratification system described herein the first and optionally the second drive system is independently configurable for moving the first and optionally the second movable sifting device in a stratification or sorting motion comprising a series of vertical or near-vertical downstrokes and upstrokes through the liquid in the stratification chamber.

In further embodiments, in the stratification system described herein, the first and optionally the second drive system is independently configurable for pausing the movements of the first and optionally second movable sifting device between completing a downstroke and/or upstroke movement and initiating the following upstroke and/or downstroke movement of the first and optionally second movable sifting device. The pause or resting period between upstrokes and/or downstrokes can be at least 0.5 seconds, such as at least 1 second, or such as at least 1.5 seconds, such at least 5 seconds, such as at least 20 seconds.

In further embodiments, in the stratification system described herein, the first and optionally the second drive system is independently configurable for adjusting the acceleration, the velocity and/or the amplitude of a downstroke and/or an upstroke of the first and optionally the second movable sifting device. In some embodiments the first and optionally the second drive system is independently configurable for adjusting the acceleration between 1 mm/s$^2$ to 10.000 mm/s$^2$, such as between 5 mm/s$^2$ to 5.000 mm/s$^2$, such as between 10 mm/s$^2$ to 1.000 mm/s$^2$, such as between 20 mm/s$^2$ to 500 mm/s$^2$, such as between 50 mm/s$^2$ to 100 mm/s$^2$. In other embodiments the first and optionally the second drive system is independently configurable for adjusting the velocity between 1 mm/s to 10.000 mm/s, such as between 5 mm/s to 5.000 mm/s, such as between 10 mm/s to 1.000 mm/s, such as between 20 mm/s to 500 mm/s, such as between 50 mm/s to 100 mm/s. In particular, the first and optionally the second drive system is independently configurable for adjusting the velocity to be greater than the sedimentation velocity and/or hindered settling sedimentation velocity, such as up to 10% greater, such as up to 20% greater, such as up to 30% greater, such as up to 40% greater, such as up to 50% greater, such as up to 60% greater, such as up to 60% greater, such as up to 70% greater, such as up to 80% greater, such as up to 90% greater, such 100% greater or more. In some embodiments the first and optionally the second drive system is independently configurable for adjusting the the amplitude between 1 mm to 50 m, such as between 10 mm to 25 m, such as between 100 mm to 20 m, such as between 500 mm to 15 m, such as between 1 m to 10 m, such as between 2 m to 5 m.

In some embodiments, in the stratification system described herein, the first drive system is configurable for adjusting the amplitude of the movements of the first sifting device during the treatment of the composition to be treated, between an upper resting position and a maximum lower position ensuring that the particulate matter remains submersed in the liquid during the treatment. In an optional embodiment, in the stratification system as described herein, the second drive system is configurable for adjusting the amplitude of the movements of the second sifting device during the treatment of the composition to be treated, between a lower resting position and a maximum upper position. The maximum lower position of the first sifting device during treatment is suitably above the maximum upper position of the second sifting device or these positions can be overlapping upon synchronizing the movements for the first and optionally second sifting devices, so as to avoid collision between the sifting devices.

In further embodiments, in the stratification system described herein, the first and optionally the second drive system is independently configurable for adjusting the amplitude, the velocity and/or accelation during a stroke.

In some embodiments the first and the optional second drive system can be powered by one joint power source or engine, or they can be powered by independent power sources or engines. Whether using a joint or separate power source the movements provided by the first and optional second drive system is suitably synchronized.

In some embodiments the first and the second sifting device can be powerwisely interconnected so the the first drive system can drive both the first and the optional second sifting device.

The drive systems described herein may be similar or the same as the drive system described in WO2020/119873 incoporated herein by reference.

Discharge System

In some embodiments the stratification system comprises means for discharging the particles (500) after treatment in the stratification chamber (100). The treatment of particles in the stratification chamber divides the particles into layers (550) of similar fluid-mechanical properties and accordingly, in some embodiments, the means for discharging the particles comprise a discharge system (800) configured for discharging the particles in rounds or cycles where particles having similar fluid-mechanical properties are discharged portionwise for each discharging round or cycle, optionally to discharge particles in portions of one or more layers (550) of particles for each discharging round or cycle. Particles of similar fluid-mechanical properties can occupy several layers of sorted particles, so in some embodiments the discharge system (800) is configured, so that particles are discharged in portions of one layer per discharging round or cycle, while in other embodiments the discharge system (800) is configured so that 2, 3, 4 or more layers are discharged per discharging round or cycle. In further embodiments the discharge system 800 is configured so that the number of layers discharged per discharging cycle change during the discharging process. For example, suitably the configuration can include that in the beginning of a discharging process, the number of layers discharged per discharging cycle can be higher such as 2 or more layers, while towards reaching layers of particles having different fluid-mechanical properties than the initially discharged particles, the number layers discharged per discharging cycle are reduced such as to 2 or 1 layers.

In further embodiments, the discharge system (800) provides for discharging layers from from top to bottom or vice versa. This may have the effect of simplifying the discharge process as the layers (550) may be discharged through the same outlet as no separate discharge outlets are required. It may have the further effect of allowing a discharge order of the discharged layers to be maintained. This in turn may allow a more efficient handling of the discharged layers in subsequent processes such as for example washing, drying, packaging, storing and/or transportation.

Accordingly, in some embodiments the stratification system described herein comprises a discharge system (800) for discharging the particulate matter from the liquid within the stratification chamber, and wherein the discharge system is configurable for discharging one or more, optionally uppermost layers of the particulate matter. Furthermore, in an embodiment the discharge system is configurable for repeatedly discharging one or more, optionally upper-most, layers of particles (500) of the particulate matter.

In some embodiment the discharge system (800) comprises a scraping device (802) configurable for sequentially scraping off one or more, optionally, upper-most layers of particles (500), onto a desired location such as a container (803), as seen in FIGS. 11*a* to 11*e* disclosing a sequence of discharging the layers of particles from the stratification chamber.

The discharge system can also comprise an extraction device, which in some embodiments can be a vacuum device. Such vacuum device may discharge single or multiple layers from the stratification chamber by sucking up the layer(s) and exhausting them at a desired place.

The discharge system may also comprise both the scraping device and a vacuum device.

The discharge system may be configured to coordinate with means for placing the sorted particles at a predetermined location, such as at a selected discharging height. This can for example be achieved by lifting up the bed of sorted particles to the said discharging height, where the particles can be discharged. In this embodiment the first drive system is suitably configurable for lifting the first movable sifting device above the discharging height, where the particulate matter can be discharged. Further, where the stratification system comprises a second sifting device and a second drive system, the second drive system may be configurable for lifting the second movable sifting device and placing sorted particles resting on the second movable sifting device's upper surface to the discharging height. The discharging height is suitably a height where the particles, wholly or in part, is lifted above the surface of the liquid.

Identification

Figure 9B:
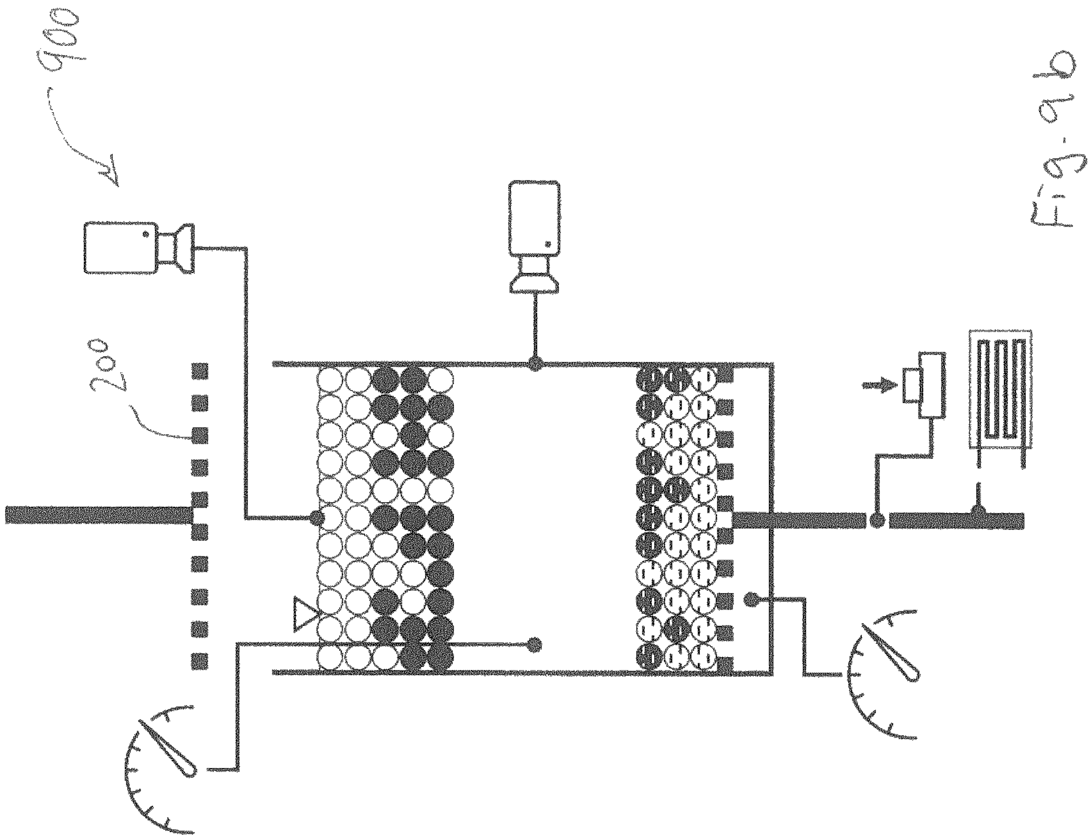
FIG. 9*b* shows additional embodiments of the stratification system of the invention.
Figure 9A:
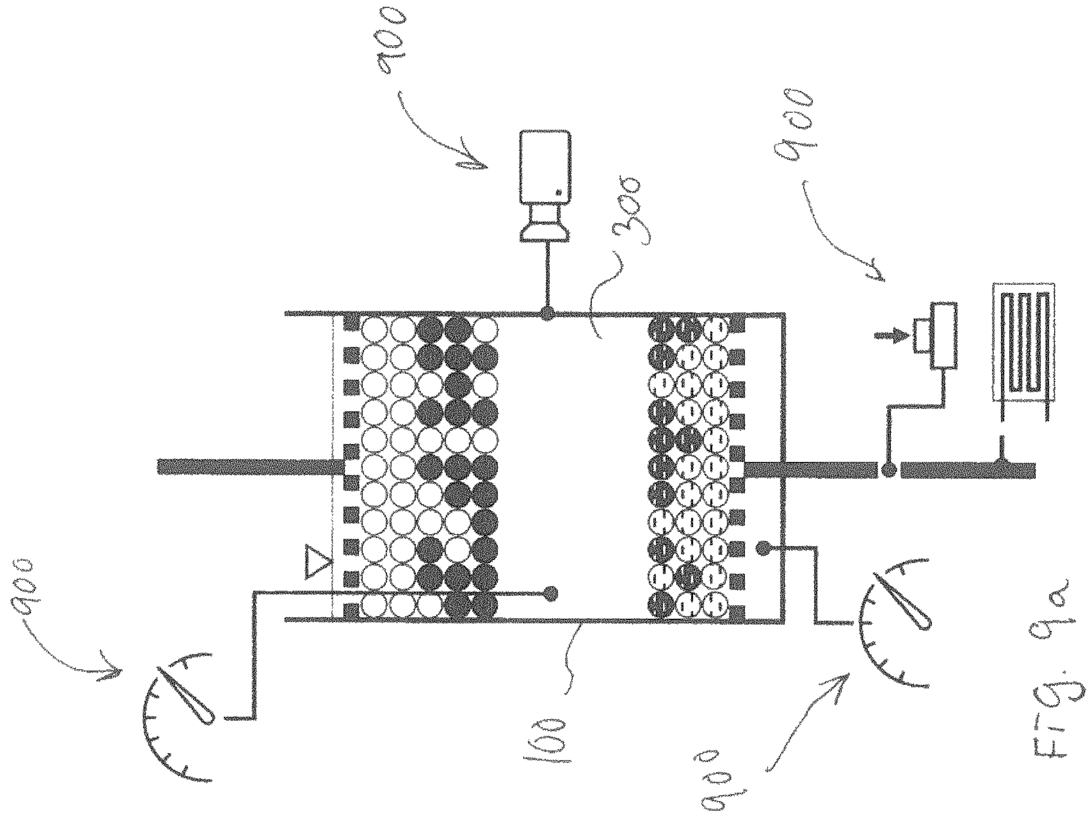
FIG. 9*a* shows additional embodiments of the stratification system of the invention.
Figure 10:
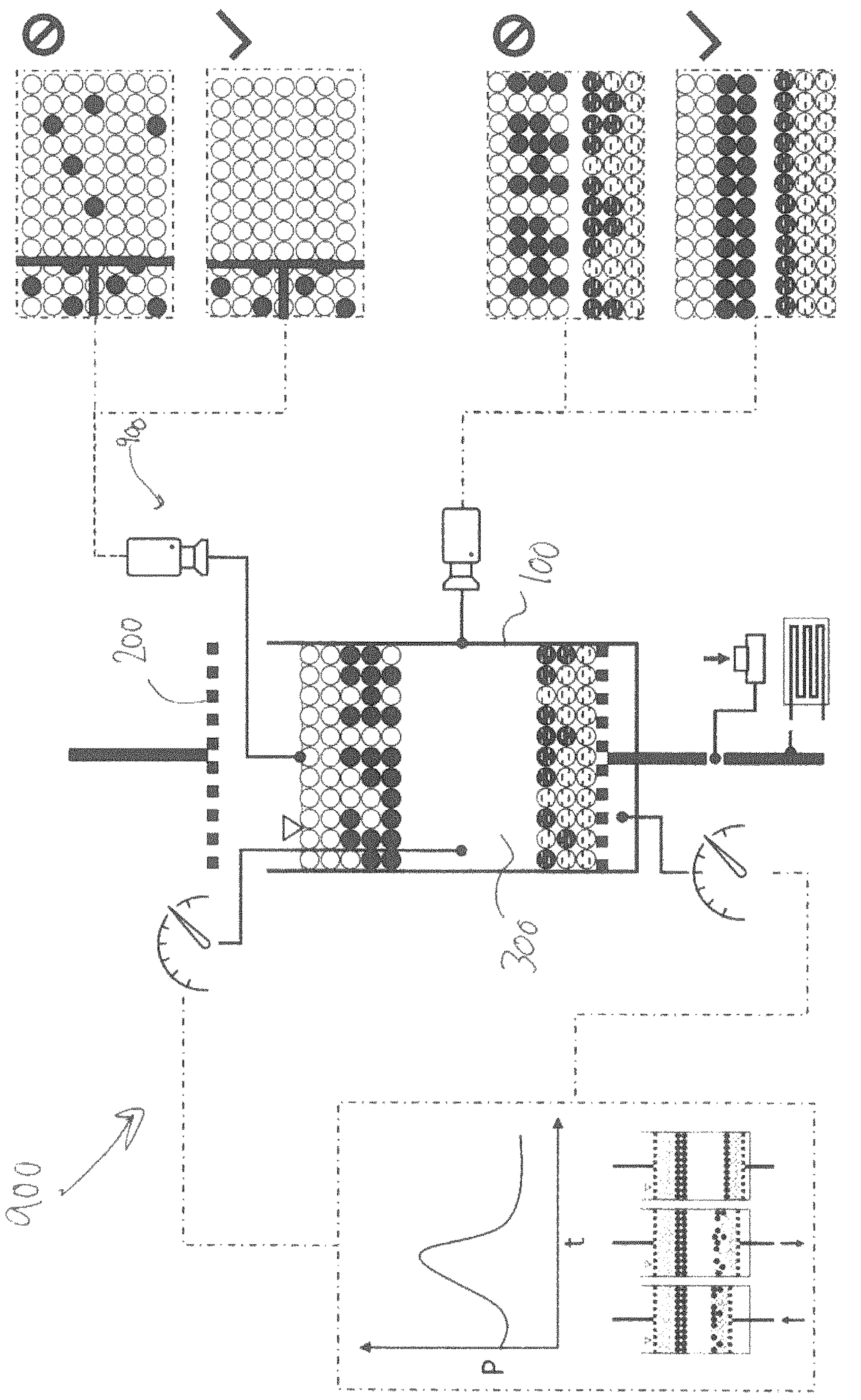
FIG. 10 shows yet another embodiment of the stratification system of the invention.

The stratification system described herein can also comprise means for identifying and/or detecting particles of different fluid-mechanical properties, and in particular detecting and/or distinguishing layers of particles having one predominant type of fluid-mechanical properties from layers of particles having a different predominant type of fluid-mechanical properties. Accordingly, the stratification system described herein can further comprise an identification system (900) for identifying different types of particles (500), suitably having different fluid-mechanical properties, said identification system comprising at least one detector capable of detecting differences in the said fluid-mechanical properties. In addition or alternatively, the detector can also distinguish one or more characteristic of the chemical composition of one type of particles (500) from one or more characteristic of the chemical composition of another type of particles (500). Said detector can suitably include a camera detecting UV, visible, mid-infrared and/or infrared light or images of the one or more layers, optionally upper-most, of the particulate matter. In FIGS. 9*a*, 9*b* and 10 different embodiments of positions of the identification systems (900) are shown.

Additionally or alternatively, the detector can detect transition between fractions of the sorted particles having different fluid-mechanical properties during or after discharge of the sorted particles from the stratification chamber. The identification of the transition may also be achieved optically by means of a camera detecting UV, visible, mid-infrared and/or infrared light or images. The term "transition" may be understood as the point between subsequently discharged sorted particles, where one fraction of sorted particles ends and the next fraction of sorted particles begins.

Additionally or alternatively, transition zones or layers where particles may not be satisfactorily sorted may be taken aside and re-sorted. Additionally or alternatively, the order in which the layers of sorted particles fractions are discharged from the stratification chamber is maintained in at least one subsequent process. This may have the effect of improving the efficiency of subsequent processes such as storing and packaging the discharged fractions of particles as highlighted above. Additionally or alternatively, the layers of sorted particles fractions are stored and/or packaged according to the order of discharge from the stratification chamber.

Additional System Elements

In further embodiments, the stratification system described herein can further comprise means for removing gas, such as air from the liquid during the stratification process. The liquid can contain gas (940), usually in the form of bubbles, generated during the filling process or generated by the sorting motion during stratification and gas bubbles can seriously impede the effectiveness of sorting. Means (950) for removing gas can include devices providing stirring or vibrations, such as agitators (951) and/or ultrasound generators (952). In FIGS. 14 to 19 different embodiments for removing gas are shown.

Additionally, the stratification system described herein can comprise one or more pressure gauges for measuring pressure in the stratfication chamber during the sorting process. In one embodiment such pressure gauge can be placed in the stratfication chamber below the first sifting device, such as below the lowest position of the first sifting device.

Additionally, the stratification system described herein can comprise one or more further visual detectors, such as cameras inside the stratificaton chamber, for monitoring the sorting process and its progress. Such detectors are suitably placed and configured so that they can receive light signals from the interior of the stratification chamber carrying information about the composition of liquid and particles. Such detector provides for the advantage of monitoring the sorting process and the ability for example to detect when the sorting process is complete. In FIGS. 9*a*, 9*b* and 10 different detectors are shown as well as their positions together with the identification system.

Additionally, the stratification system described herein can comprise one or more strain gauges connected to the first and/or the second drive systems and configured to monitor the strain or force conveyed by the drive engine via the drive shaft to sifting device(s). Such strain gauge provides for the advantage of monitoring the force applied to the sifting device and in turn to regulate for example the acceleration of the sifting device(s) during the sorting process.

Additionally, the stratification system described herein can comprise one or more weight detectors configured to weigh the particles prior to sorting. Such strain weight detector provides for the advantage of dispensing the right amount of particles into the sorting system, which is important for having an optimal sorting process with respect to both capacity and sorting quality.

Method

In a separate aspect, also described herein is a stratification method for treating a composition comprising a liquid and a particulate matter comprising the steps of:

a) providing a stratification system as described herein;
b) providing a composition to be treated comprising a liquid and a particulate matter, wherein the particulate matter comprises two or more types of particulate matter having i) a minimum particle size, ii) a density lower than the density of the liquid and iii) different fluid-mechanical properties in the liquid;

c) placing the composition to be treated in the container and/or stratification chamber of the stratification system below the first sifting device of the stratification system;

d) providing a series of downwards and upwards movement of the particulate matter within the liquid by means of downstrokes and upstrokes of the first sifting device, each movement characterised in having an acceleration, a velocity and an amplitude, whereby the particulate matter is stratified or sorted into layers of particles (500) having similar fluid-mechanical properties; and e) optionally discharging one or more layers of the particular matter from the container and/or stratification chamber and into one or more separate containers.

Working Example—Sorting Granular Matter Consisting of PE and PP.

A composition of 7% PP (Polypropylene) and 93% PE (polyethylene) both having densities lower than water was grinded and sidted using a 6 mm mesh size. Particles sizes ranged from 2 mm to 6 mm, with an average size of the granular matter to be 4.5 mm. The grinded particles had flake and 3D solid shapes. Properties of the particles were as follows:

| Polymer | Density | Shape |
|---|---|---|
| PP (Polypropylene) | 0.900 g/cm$^3$ | Flakes |
| PE (polyethylene) | 0.948 g/cm$^3$ | 3D solids |

A sorting machine as illustrated in the figures equipped with a first upper movable plate sieve and a second lower movable plate sieve, both connected a drive system for vertically moving the the sieves was used to stratify the two types of plastic particles. The system had a capacity of 64 L or 0.064 m$^3$ and 8.3 kg of particle composition and 41.8 liters of water were loaded in the stratification chamber below a first upper plate sieve and above a second lower plate sieve. A detergent was added to the water to reduce the surface tension of the water. Upon loading the particles and water into the stratification chamber the particles formed a particle bed below the lower surface of the first sieve. The first sieve was lowered in the stratification chamber, so that the particle bed was pushed 150 mm beneath the water surface and the particles were covered in water in all positions of the sieves during the sorting process.

The first upper moveable plate sieve was configured to follow a predetermined motion pattern consisting of a series of vertical down- and up-strokes through the liquid, while the position of the first upper moveable plate was not allowed to go higher than the height of the water surface.

The predetermined motion pattern included the following steps:

a) a vertical downstroke of the first upper sieve pushed the particles downwards. This motion gave space for the following vertical upstroke of the first upper sieve.

b) the first upper sieve was moved upwards with a specified motion until a max position, where the particles sedimented on the lower surface of the first upper sieve.

c) the motion of the first upper sieve was the paused for 5 seconds after completing the upstroke allowing the particles to reform the particle bed on the lower surface of the first upper sieve.

d) Steps a) to c) were repeated until the particles were acceptably stratified into layers consisting of PE and PP.

The system was configured as follows:

| | |
|---|---|
| Total duration of the sorting process | 255 seconds |
| Amplitude of movement of the upper sieve: | 50 mm |
| Speed of upstroke or upwards movement of the upper sieve: | 10 mm/s |
| Speed of downstroke or downwards movement of the upper sieve: | 6 mm/s |
| Acceleration of upstroke or upwards movement of the upper sieve: | 1500 mm/s$^2$ |
| Acceleration of downstroke or downwards movement of the upper sieve: | 1500 mm/s$^2$ |
| Pause period between downwards and upwards movement of the upper sieve: | 1 seconds |
| Pause period between upwards and downwards movement of the upper sieve: | 5 seconds. |

It was observed that the velocity at which the particles sedimented depended on related to and depended on the fluid-mechanical properties, including the density of the particles being sorted. The PP particles, being the lighter particles, sedimented more quickly and concentrated highest in the particle bed closest to the lower surface of the first upper sieve, while the PE particles, being the heavier particles, sedimented more slowly and concentrated lowest in the particle bed farthest away from the lower surface of the first upper sieve.

After completing the stratification process, the first upper sieve was moved above the water surface and the second lower sieve was configured to be lifted to bring the particle bed, now resting on the upper surface of the second lower sieve, to a discharging height where the upper part of the particle bed was raised above the water surface, so that the upper-most layer of particles (PP), was above the water surface. A scraping device configured to scrabe off the upper-most layer of particles (PP) above the water surface swiped the particle bed and scraped the upper-most layer of particles (PP) into a dedicated container. The second lower sieve was the raised to bring the next layer of particles to the discharging height and the scrabing process was repeated. This process was repeated until a change of particle type (PE) was detected. The the discharging process was repeated, scraping the particles (PE) into a separate container.

After sorting the particles and discharging them into separate fractions, random samples were taken from each fraction which were analysed for purity. The analysis showed that one fracton had 99,54% PE particles and 0,46% PP particles, while the other fraction has 99,29% of PP particles and 0,71% PE particles.

REFERENCES

1: Stratification system
100: Stratification chamber
101: Side Wall
102: Stratification chamber base
103: Stratification chamber inlet
104: Stratification chamber outlet
200: First Sifting device
201: Lower surface of first sifting device
202: Second Sifting device
203: Upper surface of second sifting device
300: Liquid
400: Particulate matter

500: Particles
550: Layers of particles
600: Drive system
605: Drive engine
606: Drive shaft
609: Shaft connector
800: Discharge system
802: Scrabing device
803: Container
900: Identification system
940: Gas
950: Means for removing gas
951: Agitators
952: Ultra-sound or vibration generator
1000: Chamber seal
1001: Top housing body
1002: Bottom housing body
1003: Wiper seal
1004: O-rings
1005: Rod seal
1006: Retaining element
1007: Threaded holes
1008: Through-holes
1009: Rod guide ring
1010: Flange
1100: Surfactant

The invention claimed is:

1. A system for treating a composition comprising a liquid and a particulate matter, wherein the particulate matter comprises two or more types of particles having i) a minimum particle size, ii) a density lower than the density of the liquid and iii) different fluid-mechanical properties in the liquid, wherein the system comprises a stratification machine comprising:

a) a stratification chamber for holding the combination of liquid and particulate matter, said stratification chamber having one or more side walls;

b) a first movable sifting device configured for vertical up and down movements within the stratification chamber, wherein the first movable sifting device allows the liquid of the composition to be treated to move through the sifting device, while not allowing particulate matter in the composition to be treated to move through the sifting device, during said vertical movements; and c) a first drive system connected to the first movable sifting device for moving the first movable sifting device in vertical downwards and upwards movements within the stratification chamber whereby the particulate matter within the liquid is treated;

wherein the first drive system is configured for positioning the first sifting device so that a lower surface of the first movable sifting device is above the particulate matter in the composition to be treated and whereby particulate matter is moved downwards in the stratification chamber by downwards movements of the first movable sifting device.

2. The system of claim 1, wherein the fluid-mechanical properties of the two or more types of particles differ in the particles sedimentation velocity in the liquid;

wherein the two or more types of particles differ in surface resistance, geometry and/or in density;

wherein the difference in density between the two or more types of particles is between 0 to 5 g/cm$^3$;

wherein two or more types of particles have a shape selected from one or more of spherical, cuboid, rod shaped or flake shaped particles;

wherein the longest diameter or diagonal of two or more types of particles is between 0.01 mm and 1,000 mm;

wherein the longest diameter or diagonal of two or more types of particles, ranges by a factor less than 100 between the smallest and the largest longest diameter;

wherein the weight ratio between one type of particles and another type of particles is between 1:1 and 1:1000; and/or wherein two or more types of particles comprise an organic polymeric material selected from PP, PE, PET, POM, PC, ABS, PC-ABS, PEEK, PVC or a combination thereof.

3. The system of claim 1, wherein the stratification chamber has a volume of at least 500 litres;

wherein the stratification chamber has one or more inlets for letting liquid and/or particulate matter into the stratification chamber, and wherein the first drive system is configurable for positioning the first movable sifting device vertically above said one or more inlets, to thereby allow the liquid and/or the particulate matter to be introduced into the stratification chamber beneath the first movable sifting device;

wherein the stratification chamber has one or more outlets for letting out particulate matter from the stratification chamber, and wherein the first drive system is configurable for lifting the first movable sifting device vertically above said one or more outlets;

wherein the first movable sifting device has a surface area between 0.1 m$^2$ to 100 m$^2$;

wherein the first movable sifting device is a plate sieve having sieve openings smaller than the minimum particle size of the particulate matter to thereby maintain the particulate matter within the stratification chamber below the lower surface of the first movable sifting device;

wherein the first movable sifting device comprises a porous material having pores with a longest diameter or diagonal smaller than the minimum particle size of the particulate matter to thereby maintain the particulate matter within the stratification chamber below the lower surface of the first movable sifting device; and/or wherein the first movable sifting device has an outer edge or edges being positioned adjacent to the one or more side walls of the stratification chamber during the vertical movements with any distances between the outer edge(s) of the first sifting device and the one or more side walls being smaller than the minimum particle size of the particulate matter.

4. The system of claim 1, further comprising a) a second movable sifting device configured for vertical up and down movements within the stratification chamber, wherein the second movable sifting device allows the liquid of the composition to be treated to pass through, while not allowing particulate matter in the composition to be treated to pass, during said vertical movements; and b) a second drive system for moving the second movable sifting device in vertical upwards and downwards movements within the stratification chamber whereby the particulate matter within the liquid is treated;

wherein the second drive system is configured for positioning the second sifting device so that an upper surface of the second movable sifting device is below the particulate matter in the composition to be treated and whereby particulate matter in contact with the upper surface of the second movable sifting device is moved upwards in the stratification chamber by the upwards movement of the second movable sifting device, thereby treating the composition.

5. The system of claim 4, wherein the second movable sifting device is a plate sieve having sieve openings smaller than the minimum particle size of the particulate matter to thereby maintain the particulate matter within the stratification chamber above the upper surface of the second movable sifting device;

wherein the second sifting device has an outer edge or edges being positioned adjacent to the one or more side walls of the stratification chamber during the vertical movements with any distances between the outer edge(s) and the one or more side walls being smaller than the minimum particle size of the particulate matter; and/or wherein the stratification chamber has one or more inlets for letting in liquid and/or particulate matter into the stratification chamber above the second movable sifting device.

6. The system of claim 4, wherein the second drive system is configurable for lifting the second movable sifting device and placing particulate matter resting on the second movable sifting device at a discharging height, said discharging height being a height at which the particulate matter, wholly or in part, is lifted above the surface of the liquid within the stratification chamber.

7. The system of claim 1, wherein the first drive system is configurable for lifting the first movable sifting device above a discharging height, said discharging height being a height where the particulate matter, wholly or in part, is lifted above the surface of the liquid within the stratification chamber.

8. The system of claim 1, further comprising a second drive system and a second sifting device, wherein the first drive system and/or the second drive system comprise a drive engine connected via drive shafts to the first sifting device and the second sifting device.

9. The system of claim 8, wherein the first and/or the second drive system is independently configurable for moving the first and the second movable sifting device in a stratification motion comprising a series of vertical downstrokes and upstrokes through the liquid in the stratification chamber.

10. The system of claim 9, wherein the first and/or optionally the second drive system is independently configurable for pausing the movements of the first and second movable sifting device between completing an upstroke or a downstroke movement of the first and second movable sifting device and initiating a next downstroke, or upstroke movement of the first and second movable sifting device.

11. The system of claim 10, wherein the length of the pause between completing an upstroke or downstroke and initiating a or upstroke of the first and/or second movable sifting device is at least 0.5 seconds.

12. The system of claim 10, wherein the first and/or the second drive system is independently configurable for adjusting the acceleration, the velocity and the amplitude of a downstroke and/or an upstroke of the first and/or the second movable sifting device.

13. The system of claim 12, wherein the first and/or the second drive system is independently configurable for adjusting the acceleration between 1 $mm/s^2$ to 10,000 $mm/s^2$; and the velocity to be greater than the fluid-mechanical properties of two or more types of particles as defined by the hindered settling sedimentation velocity of the two or more types of particles.

14. The system of claim 12, wherein the first and/or the second drive system is independently configurable for adjusting the amplitude between 1 mm to 50 m; and wherein the first drive system is configurable for adjusting the amplitude of the movements of the first sifting device during the treatment of the composition to be treated, between an upper resting position and a maximum lower position ensuring that the particulate matter remains submersed in the liquid during the treatment; and/or wherein the second drive system is configurable for adjusting the amplitude of the movements of the second sifting device during the treatment of the composition to be treated, between a lower resting position and a maximum upper position.

15. The system of claim 14, wherein the maximum lower position of the first sifting device during treatment is above the maximum upper position of the second sifting device, and wherein the first and second drive system operates independently or synchronously.

16. The system of claim 1, further comprising a discharge system for discharging the particulate matter from the liquid within the stratification chamber, and wherein the discharge system is configurable for discharging one or more uppermost layers of the particulate matter.

17. The system of claim 16, wherein the discharge system is configurable for repeatedly discharging one or more, optionally uppermost, layers of particles of the particulate matter.

18. The system of claim 1, further comprising an identification system for identifying different types of particles comprising at least one detector capable of distinguishing one or more characteristic of the chemical composition of one type of particles from one or more characteristic of the chemical composition of another type of particles.

19. The system of claim 1, further comprising an agitator and/or an ultrasound generator configured for removing gas from the liquid.

20. A method for treating a composition comprising a liquid and a particulate matter comprising the steps of:

a) providing the system of claim 1;

b) providing a composition to be treated comprising a liquid and a particulate matter, wherein the particulate matter comprises two or more types of particles a minimum particle size, ii) a density lower than the density of the liquid and iii) different fluid-mechanical properties in the liquid;

c) placing the composition to be treated in the stratification chamber of the system below the first sifting device of the system;

d) providing a series of downwards and upwards movement of the particulate matter within the liquid via downstrokes and upstrokes of the first sifting device and/or a second sifting device, each movement characterised in having an acceleration, a velocity and an amplitude, whereby the particulate matter is stratified or sorted into layers of particles based on fluid-mechanical properties; and e) optionally discharging one or more layers of the particulate matter from the stratification chamber and into one or more separate containers.

* * * * *